(12) United States Patent
Reilly et al.

(10) Patent No.: US 10,432,132 B2
(45) Date of Patent: Oct. 1, 2019

(54) SOLAR MOUNTING SYSTEM HAVING AUTOMATIC GROUNDING AND ASSOCIATED METHODS

(71) Applicant: RBI Solar, Inc., Cincinnati, OH (US)

(72) Inventors: Richard T. Reilly, Cincinnati, OH (US); William L. Vietas, Cincinnati, OH (US)

(73) Assignee: RBI Solar, Inc., Cincinnati, OH (US)

( * ) Notice: Subject to any disclaimer, the term of this patent is extended or adjusted under 35 U.S.C. 154(b) by 1601 days.

(21) Appl. No.: 13/932,721

(22) Filed: Jul. 1, 2013

(65) Prior Publication Data

US 2015/0000725 A1  Jan. 1, 2015

(51) Int. Cl.
*H02S 20/00* (2014.01)
*H02S 20/23* (2014.01)
*H02S 20/10* (2014.01)
*H02S 20/20* (2014.01)
*F24S 25/35* (2018.01)
(Continued)

(52) U.S. Cl.
CPC .............. *H02S 20/00* (2013.01); *F24S 25/12* (2018.05); *F24S 25/35* (2018.05); *F24S 25/632* (2018.05); *F24S 25/636* (2018.05); *F24S 25/70* (2018.05); *H02S 20/10* (2014.12); *H02S 20/20* (2014.12); *H02S 20/23* (2014.12); *Y02B 10/12* (2013.01); *Y02E 10/47* (2013.01); *Y10T 29/49002* (2015.01)

(58) Field of Classification Search
CPC ......... Y02E 10/50; Y02B 10/10; Y02B 10/12; H02S 20/00; H02S 20/10; H02S 20/23; H02S 30/10; F24J 2/5211; H01L 31/042; H01L 31/048; H01R 4/28; H01R 4/30; H01R 4/34
See application file for complete search history.

(56) References Cited

U.S. PATENT DOCUMENTS 3,164,055 A  1/1965 Duffy
6,093,884 A  7/2000 Toyomura et al.
(Continued)

OTHER PUBLICATIONS

Schletter Inc., FS System (TM) Ground Mount Installation Manual, ISO MI-008, Tucson, Arizona, 85706, <http://www.schletter.us/support/FS%20InstallationInstructionsETL.pdf>, Feb. 21, 2013 (9 pages).
(Continued)

*Primary Examiner* — Mayla Gonzalez Ramos
(74) *Attorney, Agent, or Firm* — Wood Herron & Evans LLP

(57) ABSTRACT

A solar mounting system includes at least one solar panel with a panel frame and a support structure including at least one elongated support rail configured to support the panel frame of the at least one solar panel. The elongated support rail includes a grounding structure with a raised edge formed from material of the at least one elongated support rail. The raised edge is configured to cut through a protective coating surrounding a conductive material forming the panel frame, thereby grounding the solar panel by providing direct electrical contact between the panel frame and the at least one elongated support rail. This automatic grounding does not require additional grounding equipment or elements to be added to the solar mounting system.

22 Claims, 11 Drawing Sheets

(51) Int. Cl.
*F24S 25/12* (2018.01)
*F24S 25/70* (2018.01)
*F24S 25/636* (2018.01)
*F24S 25/632* (2018.01)

(56) References Cited

U.S. PATENT DOCUMENTS

| | | |
|---|---|---|
| 6,269,596 B1 | 8/2001 | Ohtsuka et al. |
| 6,368,038 B1 | 4/2002 | Uno |
| 6,465,724 B1 | 10/2002 | Garvison et al. |
| 7,406,800 B2 | 8/2008 | Cinnamon et al. |
| 7,435,134 B2 | 10/2008 | Lenox |
| 7,566,250 B1 | 7/2009 | Good |
| 7,625,238 B2 | 12/2009 | Duesterhoeft |
| 7,780,472 B2 | 8/2010 | Lenox |
| 7,866,099 B2 | 1/2011 | Komamine et al. |
| 7,971,398 B2 | 7/2011 | Tweedie |
| 8,025,508 B2 | 9/2011 | Parker et al. |
| 8,092,129 B2 | 1/2012 | Wiley et al. |
| 8,109,048 B2 | 2/2012 | West et al. |
| 8,136,310 B2 | 3/2012 | Tweedie |
| 8,156,697 B2 | 4/2012 | Miros et al. |
| 8,181,926 B2 | 5/2012 | Magno, Jr. et al. |
| 8,191,320 B2 | 6/2012 | Mittan et al. |
| 8,266,848 B2 | 9/2012 | Miros et al. |
| 8,353,650 B2 | 1/2013 | Wiley et al. |
| 8,375,654 B1 | 2/2013 | West et al. |
| 2005/0126621 A1 | 6/2005 | Dinwoodie et al. |
| 2007/0144575 A1 | 6/2007 | Mascolo et al. |
| 2009/0025314 A1 | 1/2009 | Komamine et al. |
| 2009/0142945 A1 | 6/2009 | Duesterhoeft |
| 2009/0242014 A1 | 10/2009 | Leary |
| 2009/0266400 A1* | 10/2009 | DeLiddo ............... F24J 2/5245 136/244 |
| 2011/0000519 A1 | 1/2011 | West |
| 2011/0024585 A1 | 2/2011 | Brinkdopke et al. |
| 2011/0039430 A1 | 2/2011 | Aftanas |
| 2011/0210085 A1 | 9/2011 | Plaisted |
| 2011/0214366 A1 | 9/2011 | Haddock et al. |
| 2011/0214367 A1 | 9/2011 | Haddock et al. |
| 2011/0214368 A1 | 9/2011 | Haddock et al. |
| 2012/0061337 A1 | 3/2012 | Seery et al. |
| 2012/0097816 A1 | 4/2012 | Tamm et al. |
| 2012/0125408 A1 | 5/2012 | Reyes et al. |
| 2012/0125410 A1 | 5/2012 | West et al. |
| 2012/0145228 A1 | 6/2012 | Miros et al. |
| 2012/0175322 A1 | 7/2012 | Park et al. |
| 2012/0193310 A1 | 8/2012 | Fluhrer et al. |
| 2012/0204935 A1 | 8/2012 | Meyer et al. |
| 2012/0222718 A1 | 9/2012 | Sweeney |
| 2012/0240489 A1 | 9/2012 | Rivera et al. |
| 2012/0275066 A1* | 11/2012 | O'Brien ............... F24J 2/5237 361/1 |
| 2013/0015303 A1 | 1/2013 | Gies et al. |
| 2013/0032200 A1 | 2/2013 | Schnitzer et al. |
| 2013/0146554 A1* | 6/2013 | Berry ............... H01L 31/0422 211/175 |
| 2014/0026946 A1* | 1/2014 | West ............... F24J 2/5205 136/251 |
| 2014/0041321 A1* | 2/2014 | Poivet ............... F24J 2/5245 52/173.3 |

OTHER PUBLICATIONS

Sharp Electronics Corporation, Solar Energy Solutions Group, "Sharp Photovoltaic (PV) Module Alternate Grounding Addenedum," PCMAN—Alternate Grounding Addendum—n.12, Apr. 12, 2012 (14 pages).

Wholesale Solar, "Wholesale Solar's Comprehensive Guide: IronRidge Rails with the Wiley WEEB Ground System Including Optional QuickMount Flashings," <http://www.wholesalesolar.com/pdf.folder/mount%20pdf%20folder/IronridgeXRS_Rail_System.pdf>, Feb. 21, 2013 (23 pages).

IronRidge, Standard Rail (XRS) Roof Mounting System Installation Manual, 2012 Edition, Version 1.2, (7 pages).

Wiley Electronics LLC "Washer, Electrical Equipment Bond WEEB Installation Instructions for IronRidge," Document No. 104-0404-000039-000, (2006-2010) (12 pages).

\* cited by examiner

SOLAR MOUNTING SYSTEM HAVING AUTOMATIC GROUNDING AND ASSOCIATED METHODS

FIELD OF THE INVENTION

The present invention relates generally to a solar mounting system and, more particularly, to grounding of solar panels that are mounted using the solar mounting system.

BACKGROUND

Solar mounting systems, designed for supporting varying numbers of solar panels with photovoltaic cells, are being installed as an alternative source of energy in many different settings, including smaller residential assemblies and larger commercial or utility assemblies. Especially in the context of larger solar mounting systems containing hundreds or thousands of solar panels at a single installation site, it is desirable to simplify the process and cost of installing the solar panels onto the support structures that maintain the solar panels raised above a base surface such as a roof or ground. Each separate step that must be performed to reliably connect and mount a solar panel onto the support structure must be repeated hundreds or thousands of times in this context, which results in significant additional hours of labor needed during installation for any additional steps that become necessary when mounting each solar panel. Therefore, the designers of solar mounting systems continue to endeavor for quicker and simpler installation techniques that still adequately provide the structural support and electrical bonding and/or grounding connections required for each of the solar panels.

In one example, each of the solar panels on a solar mounting system must be electrically bonded and/or grounded at conductive portions of the solar panels, such as the panel frames. For safety purposes, any conductive portion of the solar panels should be bonded or connected to an electrically conductive path configured to safely conduct any electrical current in the conductive portions to ground potential and away from the sensitive photovoltaic cells and other energy-producing equipment on the solar mounting system. However, the grounding of panel frames in solar mounting systems is made difficult by other design considerations necessary for solar mounting systems, such as the need to protect the conductive portion of the panel frames from harsh environmental conditions that may lead to corrosion and deterioration of the panel frames. As a result of this latter design consideration, panel frames formed from aluminum or a similar metallic material may be anodized and/or coated to provide a protective coating, which may be electrically insulative, to resist environmental conditions and corrosion. For anodized aluminum, the anodizing process effectively coats the outer surface of the aluminum electrolytically with a protective or decorative oxide that tends to protect the remainder of the aluminum material from environmental effects. But this protective coating makes it difficult to readily form an electrical bonding and/or grounding connection with the conductive portion of the panel frames, which is required when grounding solar panels.

One common practice to overcome this difficulty includes installing a separate grounding lug on each panel frame or piece that is coated or anodized. The grounding lug is typically attached to the panel frame via a thread forming stainless steel screw, which produces an air-tight connection when fastened to the panel frame. The stainless steel screw then optionally contacts a star washer in contact with a grounding lug frame, or contacts the grounding lug frame directly. A copper wire is captured by the grounding lug frame and runs through a plurality of the grounding lugs such that a common conductive path is defined from the panel frames, through the respective ground lug frames, and into the copper wire, which leads to ground potential.

Another example of a known grounding lug is shown in U.S. Patent Publication No. 2012/0125408 to Reyes et al., which illustrates the grounding lug as a separate piece that must be attached to each solar panel. Both of these grounding lugs require multiple connections between the parts described above to reliably form the electrical bonding path between the copper wire and the panel frame, and the installation of these grounding lugs is time-consuming and complex. The additional wiring of the copper wire to each of the grounding lugs also adds additional time and expense that multiplies exponentially when producing a large solar mounting system.

To avoid the need for the separate copper wiring, another typical practice is to insert star washers or similar members between the panel frames and the support structure to form an electrical bonding connection. A star washer is formed from flat metal stock so as to include a number of internal and/or external teeth that are twisted from the plane defined by the body of the star washer. These teeth tend to cut or dig into surfaces that the star washer abuts when the star washer is tightened between two adjacent components, such as the solar panel frame and the underlying support structure. In this regard, the twisted or bent teeth in the star washer may provide a constant spring force resisting deformation back to a planar form. The use of star washers might avoid the need to provide wiring through a plurality of grounding lugs. For a typical solar panel, this may include up to four fasteners that should be provided with the additional star washer part. One example of solar panel mounting using star washers for grounding is shown in U.S. Pat. No. 7,971,398 to Tweedie.

The accurate alignment and insertion of these star washers for each solar panel increases the complexity and cost of manufacturing larger solar mounting systems. Furthermore, the star washers must be carefully selected and tailored to reliably cut through the electrically insulative coating on the panel frames being used. For example, if the star washers are not formed strong enough for the teeth to resist the compressive forces on the solar panel and the supporting structure, the teeth may bend in some washers back to a planar state with the washer body, which causes a lack of electrical contact between the panel frame and the support structure. Numerous efforts have been made to address these concerns with star washers, including thickening the star washer and/or using a modified bonding washer commercially referred to as a WEEB, both of which are described in U.S. Pat. No. 8,092,129 to Wiley et al. In other systems, different types of structures have been used in place of star washers, such as the grounding clips shown in U.S. Patent Publication No. 2012/0097816 to Tamm et al., and the grounding clamps shown in U.S. Pat. No. 8,181,926 to Magno, Jr., et al.

However, each of these alternatives to star washers still requires additional installation work and cost to add these separate grounding components during the construction of a solar mounting system. Even if several of these alternative grounding components function better or are installed more rapidly than a grounding lug or a star washer, there are still additional costs associated with providing these grounding components for each solar panel and then installing these grounding components. For example, a star washer that may cost a few cents or a modified bonding washer that may cost a bit more are minimal in costs by themselves, but these parts are required for each connection made to the solar panels, and this incremental cost aggregates into a significant added expense for larger assemblies.

There is a need, therefore, for a solar mounting system and methods that further simplify the grounding process for each solar panel, thereby minimizing installation costs and improving the solar mounting system.

SUMMARY OF THE INVENTION

The present invention overcomes the foregoing and other shortcomings and drawbacks of solar mounting systems heretofore known. While the invention will be described in connection with certain embodiments, it will be understood that the invention is not limited to these embodiments. On the contrary, the invention includes all alternatives, modifications and equivalents as may be included within the spirit and scope of the present invention.

In one embodiment, the present invention provides a solar mounting system configured to provide automatic grounding of at least one solar panel. The solar mounting system includes the at least one solar panel which includes at least one photovoltaic cell and a panel frame defined by a conductive material. The solar mounting system further includes a support structure with a plurality of support members and at least one elongated support rail supported by at least one of the plurality of support members and having a grounding structure defining a raised edge formed from material of the at least one elongated support rail. The raised edge projects outwardly from the at least one elongated support rail. When the panel frame is secured with the at least one elongated support rail, the raised edge of the grounding structure on the at least one elongated support rail provides direct electrical contact with the conductive material of the panel frame. This contact grounds the at least one solar panel when the at least one solar panel is secured in position on the solar mounting system.

In one aspect of the invention, the elongated support rail comprises a purlin having a first supporting surface with the grounding structure, a second supporting surface spaced from the first supporting surface, and at least one wall extending between the first and second supporting surfaces. The second supporting surface is configured to be mounted on the support members included in the support structure. The raised edge of the grounding structure may include at least one of a serrated leading end or a discontinuous leading end. In another aspect, the conductive material of the panel frame is coated with a protective coating that is configured to protect the conductive material from environmental conditions. In these embodiments, the protective coating may be electrically insulative compared to the conductive material, and the raised edge of the grounding structure is configured to cut through the protective coating on the panel frame when the at least one solar panel is secured with the at least one elongated support rail. Thus, even when the panel frame is coated, the automatic grounding of the at least one solar panel is still enabled by the solar mounting system.

In another aspect of the invention, the at least one elongated support rail includes at least one fastener aperture defined by a periphery. The raised edge of the grounding structure is located proximate at least a portion of the periphery. As a result, a mounting aperture in the panel frame may be aligned with the at least one fastener aperture and these mounting aperture and at least one fastener aperture may then receive a fastener used to secure the panel frame with the at least one elongated support rail. The elongated support rail may include a plurality of the fastener apertures such that a plurality of solar panels with panel frames and mounting apertures can be aligned with the fastener apertures and attached to the elongated support rail. Consequently, a single elongated support rail can be used to support and electrically bond and/or ground a plurality of solar panels. For example, the elongated support rail may extend transversely to a number of chord rails carried on respective mounting posts that collectively define the support structure. These chord rails and mounting posts may be configured for stationary mounting of the solar panels or rotatable mounting in order to follow the direction of the sun during a daily cycle.

In a related aspect of the invention, the solar mounting system further includes a bolt sized for insertion through the mounting aperture of the panel frame and the at least one fastener aperture of the at least one elongated support rail. The solar mounting system also includes a nut that is configured to engage the bolt to apply a tightening force to engage the raised edge on the elongated support rail into electrical contact with the conductive material of the panel frame. The automatic grounding of the solar panel during this fastening is caused by the raised edge engaging in direct electrical contact with the conductive material of the panel frame. To this end, no additional assistance is needed from a separate washer or element that would be sandwiched between the panel frame and the elongated support rail to ground the panel frame. Therefore, a reduced number of parts is required to assemble the solar mounting system, thereby significantly reducing installation costs and materials costs. In alternative embodiments, the nut and bolt may be replaced by a rivet fastener, which applies a tightening force to engage the raised edge of the grounding structure (which may be proximate to and/or spaced from the at least one fastener aperture) into direct electrical contact with the conductive material of the panel frame. In yet another alternative, the nut and bolt may be replaced by a clamp using a clamp fastener to force the panel frame into engagement with the raised edge of the grounding structure on the at least one elongated support rail. Regardless of the particular type of fastener or element used to fasten the solar mounting system together, the benefits of the automatic grounding by use of the raised edge are achieved by the solar mounting system.

In one specific example of the elongated support rail used with the solar mounting system, the periphery of the fastener aperture includes a plurality of side edges, and at least one of the side edges include the raised edge located proximate the at least one side edge. However, it will be understood that all of the side edges of the periphery may be located proximate the raised edges in other embodiments, regardless of the shape and size of the periphery. For example, other embodiments of the fastener aperture may define different shapes having one or more sides with raised edges, including but not limited to square-shaped, circle-shaped, elongate oval-shaped, star-shaped, and other known shapes. The raised edge may be generally smooth and continuous at the leading end, or the raised edge may include a serrated or discontinuous leading end. In any event, the raised edge may include any profile that may be used to cut through a protective coating on the panel frame in order to make the required electrical contact.

In another embodiment of the invention, an elongated support rail is used to support at least one solar panel in a solar mounting system. The elongated support rail includes a first supporting surface with a grounding structure defining a raised edge formed from material of the first supporting surface and projecting outwardly from the first supporting surface. The elongated support rail also includes a second supporting surface configured to be supported by a support structure of the solar mounting system and at least one wall extending between and connecting the first and second supporting surfaces. When the at least one solar panel is secured with the first supporting surface, the raised edge of the grounding structure on the first supporting surface provides direct electrical contact with the conductive material of the panel frame to ground the at least one solar panel. As described above, the raised edge may be formed proximate to and/or spaced from a fastener aperture or clamp aperture used with securing bolts, rivets, or clamps used to secure the at least one solar panel to the elongated support rail.

According to another embodiment, a method of installing a solar mounting system includes establishing a support structure on a base surface. The support structure includes a plurality of support members and at least one elongated support rail supported by at least one of the plurality of support members and having a grounding structure defining a raised edge formed from material of the at least one elongated support rail and projecting outwardly from the at least one elongated support rail. The method also includes positioning at least one solar panel adjacent to the at least one elongated support rail and securing the panel frame with the at least one elongated support rail. The solar panel is grounded by providing direct electrical contact between the raised edge on the elongated support rail and conductive material of the panel frame as the panel frame is secured with the elongated support rail. As a result, the grounding of the solar panel automatically occurs without requiring additional components or assembly steps that increase the cost of the assembly. More specifically, the raised edge may cut through a protective coating on the panel frame (when such a protective coating is present) as the solar panel is secured into position on the solar mounting system.

According to yet another embodiment of the invention, a method of manufacturing at least one elongated support rail for a solar mounting system is provided. More particularly, the at least one elongated support rail is produced by counterform punching aperture grounding structure into a sheet of material such that a portion of the sheet of material is deformed to produce a raised edge formed from the sheet of material. The sheet of material is bent into the at least one elongated support rail by forming first and second supporting surfaces spaced from one another, with at least one wall extending between and connecting these supporting surfaces, and the first supporting surface including the grounding structure. After production, the raised edge of the grounding structure on the at least one elongated support rail is positioned to directly electrically contact and ground a solar panel when the solar panel is mounted on the at least one elongated support rail. Consequently, the support structure itself provides all the necessary components to ground one or more solar panels when those solar panels are mounted on the support structure to form a solar mounting system.

The counterform punching of the fastener aperture may include a series of operations. For example, the counterform punching includes positioning the sheet of material within a counterform press between a hollow die button and an upper forming die including a punch, and then driving the punch and the upper forming die into the sheet of material to cause the punching and deformation required to form the fastener aperture. More particularly, a portion of the sheet of material may be removed in order to define a fastener aperture or a clamp aperture in the sheet of material, and then another portion of the sheet of material may be deformed to produce the raised edge proximate to or spaced from the fastener aperture. This process adds minimal time to the production of the elongated support rail and avoids the need for additional components and installation steps to be used while grounding a solar panel in the resulting solar mounting system.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1A:
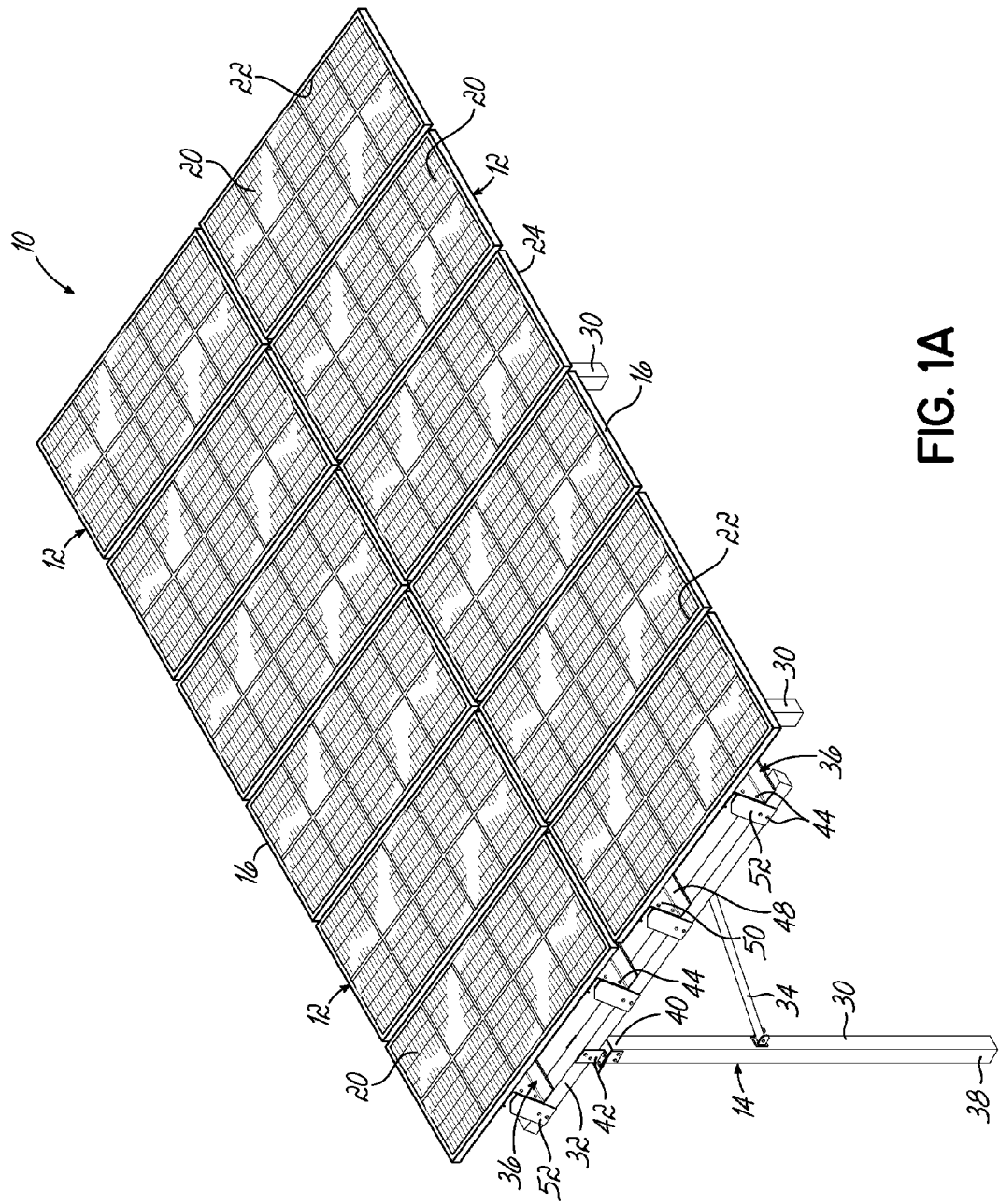
FIG. 1A is a perspective view of a solar mounting system according to one embodiment of the invention.

With reference to FIGS. 1A through 5, an exemplary embodiment of a solar mounting system 10 that enables mounting and automatic grounding of a plurality of solar panels 12 is shown. The solar mounting system 10 shown in FIG. 1A includes twelve solar panels 12 arranged in a 6-by-2 grid (e.g., in a portrait orientation) on top of a support structure 14 that is tailored in size to the number of solar panels 12 to be supported. It will be understood that the particular number and arrangement of the solar panels 12 can be modified in other embodiments, such as in larger assemblies (e.g., up to hundreds or thousands of solar panels 12) used for commercial or utility power generation, without departing from the scope of the invention. For example, FIG. 1C described in further detail below illustrates an alternative embodiment of the solar mounting system 10 in which the solar panels 12 are supported in a landscape orientation. The support structure 14 of the solar mounting system 10 in this embodiment is advantageous because grounding of each of the solar panels 12 is automatically caused without taking additional steps or installing additional grounding equipment during the regular mounting of the solar panels 12 with fasteners (not shown in FIG. 1A), such as bolts and rivets. This automatic grounding occurs even when the solar panels 12 include panel frames 16 defined by conductive material coated or covered with a protective coating (which may be electrically insulative, in some embodiments). In this regard, the support structure 14 acts as a conductive path to ground potential for each of the solar panels 12, thereby providing the safety and electrical bonding and/or grounding that is desirable when constructing the solar mounting system 10. The solar mounting system 10 and methods of assembly described in further detail below do not require the use and installation of separate grounding equipment, including, but not limited to, star washers, grounding clips, WEEB devices, grounding lugs, and copper ground wiring. Accordingly, the materials and installation cost for the solar mounting system 10 is minimized compared to known designs. However, it will be understood that the automatic grounding with the support structure 14 may also be used in combination with these types of separate grounding equipment in non-illustrated embodiments consistent with the scope of the invention.

Figure 2:
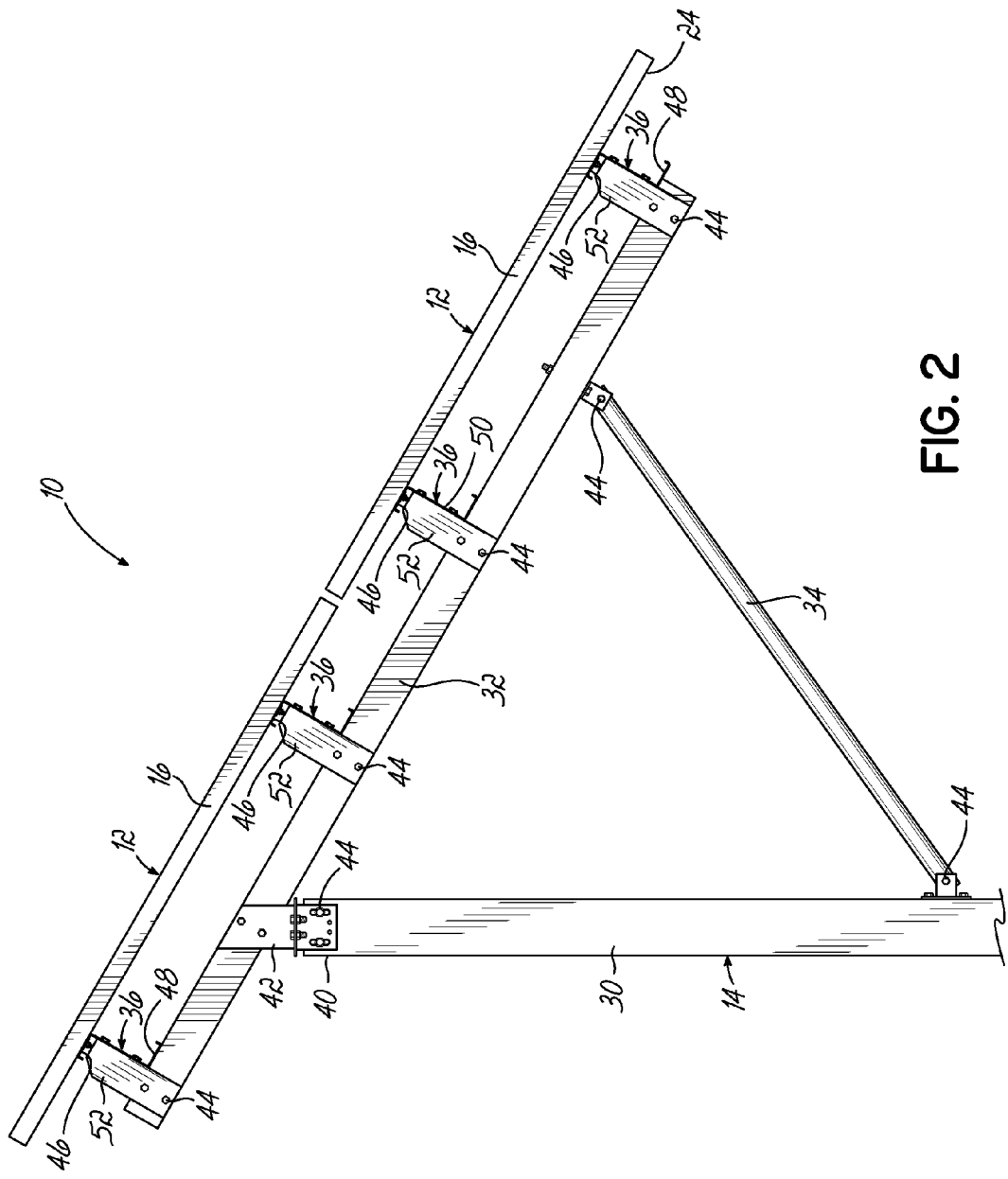
FIG. 2 is a side elevational view of the solar mounting system of FIG. 1A, with a bottom portion of mounting posts cut away.

With particular reference to FIGS. 1A and 2, the specific details of the solar panels 12 and the support structure 14 are shown in further detail. To this end, each of the solar panels 12 in this embodiment is a framed solar panel 12 having one or more photovoltaic (solar) cells 20 with corresponding peripheries surrounded by the panel frame 16. The panel frame 16 is shown and described in greater detail with reference to FIGS. 3 through 5 below (which is where the following elements are shown), but the panel frame 16 includes an upper channel 22 for receiving the photovoltaic cells 20 and a lower flange 24 spaced from the upper channel 22 and configured to be connected to the support structure 14 to mount the solar panel 12 onto the solar mounting system 10. The spacing between the upper channel 22 and lower flange 24, provided by the thickness of the panel frame 16, enables access for inserting and tightening fasteners through the lower flange 24, which is part of the process of installation and automatic grounding described below.

The panel frame 16 is typically manufactured of a metallic conductive material such as stainless steel or aluminum, but this conductive material is coated with a protective coating (not shown in FIGS. 1A through 2) such as by applying a polymeric coating or by anodizing the outer exposed layers of the conductive material when the conductive material chosen is aluminum. In the anodizing example, the process of anodizing modifies the outer exposed layers of the conductive material into a coating substantially surrounding the remainder of the conductive material. Other methods of providing a protective coating on the panel frame 16 may also be used in accordance with the scope of the present invention. This protective coating prevents the panel frame 16 from being exposed to the sometimes harsh environmental conditions where the solar mounting system 10 is installed, thereby limiting or preventing deterioration effects such as corrosion. Because this coating may be electrically insulative, any grounding features must cut through this coating to provide the electrical bonding contact with the underlying conductive material. However, the elongated support rails 36 used with the support structure 14 of the present embodiment are configured to perform this cutting through the protective coating during mounting of the solar panels 12 onto the support structure 14.

Figure 1B:
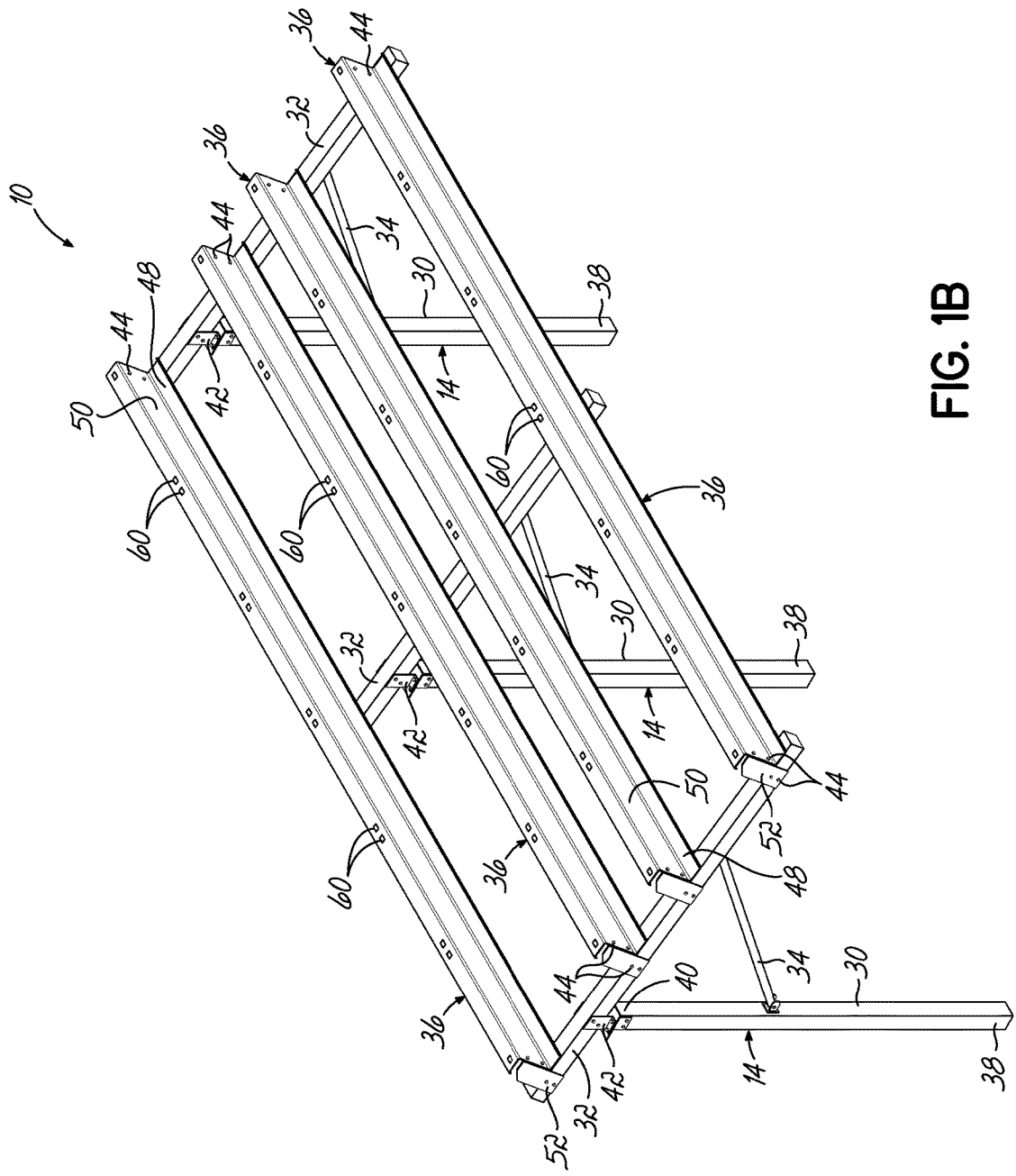
FIG. 1B is a perspective view of the solar mounting system of FIG. 1A, with the solar panels removed to show details of a support structure.

With continued reference to FIGS. 1A and 1B, the support structure 14 includes a plurality of support members (e.g., chord rails 32) and the elongated support rails 36, thereby effectively forming a grid for receiving and mounting the solar panels 12 in the positions shown. More specifically, the plurality of support members includes a plurality of mounting posts 30, a plurality of chord rails 32 connected to the mounting posts 30, and a plurality of braces 34 connected to the mounting posts 30 and chord rails 32. The plurality of elongated support rails 36 is also referred to as elongated purlins 36 throughout the following description, but it will be understood that these elongated support rails 36 may take a different form than being a "purlin" in other embodiments consistent with the invention. Similarly, the following description of the plurality of support members is an exemplary embodiment only, as each of these elements may be reshaped or reconfigured for different installations and needs of a solar mounting system 10. Each of the mounting posts 30, chord rails 32, braces 34, and elongated purlins 36 are formed from galvanized steel in the exemplary embodiment, but other rigid materials may be used without departing from the scope of the invention.

In the exemplary embodiment, the mounting posts 30 and chord rails 32 include a rectangular cross-section, while the braces 34 are tube-shaped; however, it will be appreciated that each of these support members 30, 32, 34 may define a different cross-section and shape in other embodiments of the invention, including but not limited to tubes, I-beams, and solid or hollow rectangular bars. In addition, the purlin 36 is shown as substantially Z-shaped in the exemplary embodiment, but it will be understood that other shapes and sizes such as, but not limited to, C-shaped, tube-shaped, hat-shaped, and I-beam shaped may be used for the purlins 36 in other embodiments of the invention. Although not described for every structural element below, the exemplary embodiments shown in these drawings are not to be considered limiting of the shape and size of the elements that may be used in combination to define the support structure 14 and the solar mounting system 10.

The mounting posts 30 extend generally vertically and include a bottom end 38 configured to be firmly driven into a base surface such as the ground or mounted on a roof and a top end 40 located opposite the bottom end 38. One of the chord rails 32 is connected to the top end 40 of each mounting post 30 using a connector bracket 42 as shown. As will be readily understood, the connector bracket 42 is a rigid connector that is fastened onto the chord rail 32 and the mounting post 30 by bolt fasteners 44 in the exemplary embodiment. In alternative embodiments, the connector bracket 42 and other similar connecting structures between other pairs of support members described below could be replaced by welding or some other known method for fixedly connecting two steel support members. The chord rails 32 are typically mounted in an angled orientation from horizontal and positioned so as to be generally cantilevered along most of the length of the chord rails 32. The braces 34 are then connected so as to extend from a point on the respective mounting post 30 between the bottom and top ends 38, 40 to a point on the respective chord rail 32 along the cantilevered portion of the chord rail 32. The braces 34 may be pivotally coupled with bolt fasteners 44 or fixedly coupled in different embodiments. The mounting posts 30, chord rails 32, and braces 34 provide rigid support for the stationary mounting of the elongated purlins 36 and the solar panels 12, but it will be understood that the connections between these support members may also be configured to enable pivoting movement of the solar panels 12 as well.

After each of the mounting posts 30, chord rails 32, and braces 34 are installed, the elongated purlins 36 are attached to at least one portion of the chord rails 32 to form the grid-like framework for supporting the solar panels 12. To this end, the elongated purlins 36 include elongated generally Z-shaped beams or rails having a longitudinal length that is oriented transverse to the chord rails 32. More particularly, the elongated purlins 36 include a first supporting surface 46 and a second supporting surface 48 extending generally parallel, and spaced from each other, on opposite ends of a central wall 50. The first supporting surface 46 is configured to abut the panel frames 16 of the solar panels 12 as shown in FIG. 2, while the second supporting surface 48 is positioned to abut the chord rails 32 when the elongated purlins 36 are installed on the support structure 14. As described above, the purlins 36 may define a different cross-sectional shape in other embodiments consistent with the invention, including but not limited to: C-shaped, tube-shaped, hat-shaped, or I-beam shaped.

Figure 3:
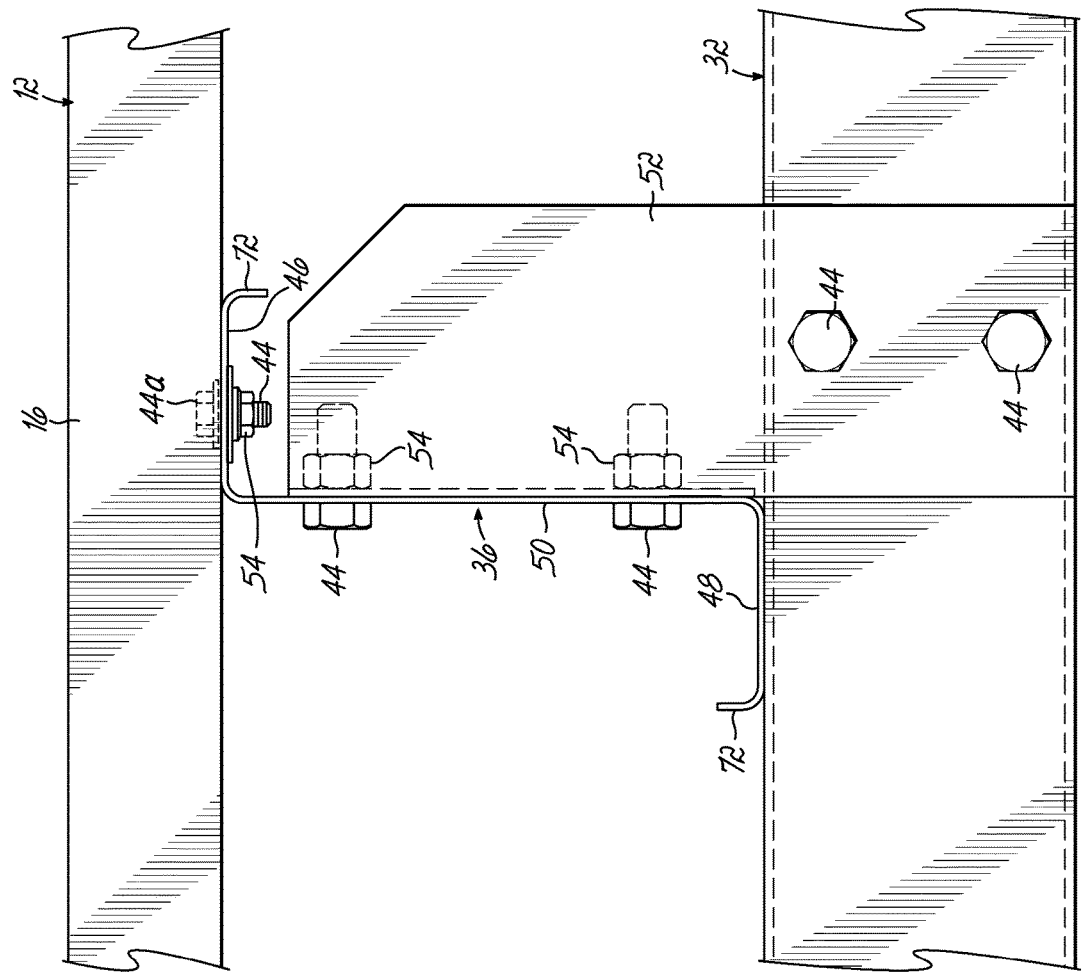
FIG. 3 is a detailed side view of an elongated support rail or purlin used with the support structure shown in FIG. 2, and showing specific details of connections between the purlin and each of a solar panel and a chord rail extending transverse to the purlin.

A plurality of purlin mounting brackets 52 are provided for connecting the elongated purlins 36 to the chord rails 32. Similar to the connector brackets 42 previously described, the purlin mounting brackets 52 are connected to one of the elongated purlins 36 and one of the chord rails 32 by bolt fasteners 44 in the exemplary embodiment (FIG. 2). The purlin mounting brackets 52 are shown as L-shaped brackets that are positioned to abut and be fastened to a top or side of the chord rails 32 and to the central wall 50 of the elongated purlins 36, but the purlin mounting bracket 52 may also be reshaped or repositioned to connect to other portions of the elongated purlins 36 and chord rails 32 in other embodiments of the invention. The purlin mounting brackets 52 are fastened in position with bolt fasteners 44 in the exemplary embodiment shown, but it will be appreciated that other methods for accurately positioning and securing the purlins 36 in position on the chord rails 32 (including some embodiments without purlin mounting brackets 52) may be used in other embodiments of the present invention. The purlin mounting brackets 52 may be positioned only on the opposing ends of the elongated purlins 36, or these purlin mounting brackets 52 may be provided at each of the chord rails 32 along the length of the elongated purlins 36. Once each of the elongated purlins 36 is mounted and secured into position on the chord rails 32 (such as by tightening of nuts 54 associated with the bolt fasteners 44 as shown in FIG. 3, or the use of rivets or clamps in other embodiments), the assembly of the support structure 14 is complete and the support structure 14 is ready for mounting of the solar panels 12. As shown most clearly in FIG. 1B, the grid-like construction of the chord rails 32 and the elongated purlins 36 forms a solid reliable base for the plurality of solar panels 12.

Figure 1C:
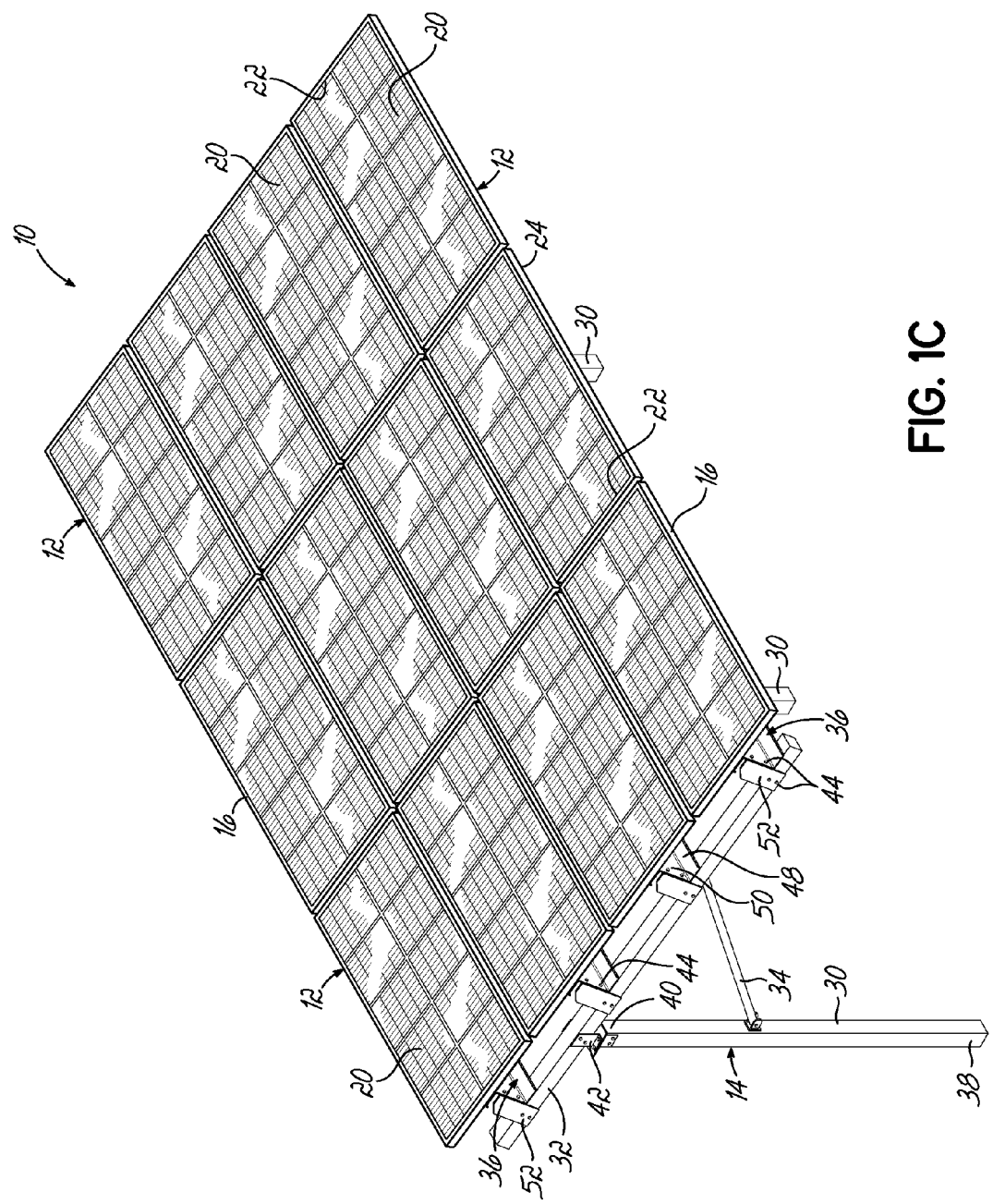
FIG. 1C is a perspective view of another embodiment of a solar mounting system similar to FIG. 1A, including solar panels mounted in a landscape orientation rather than a portrait orientation.

As described briefly above, FIG. 1C illustrates an alternative embodiment of the solar mounting system 10 which supports the plurality of solar panels 12 in an alternative orientation. More specifically, each of the solar panels 12 is rotated about 90 degrees from the portrait orientation shown in FIG. 1A to a landscape orientation (a 3-by-4 grid) with a longitudinal direction directed between multiple mounting posts 30 and chord rails 32. The solar panels 12 continue to be mounted on elongated purlins 36 and electrically bonded and/or grounded by the process described in detail below with reference to the exemplary embodiment. It will be appreciated that the solar panels 12 may be reoriented and resized in many different manners without departing from the scope of the present invention.

Figure 4:
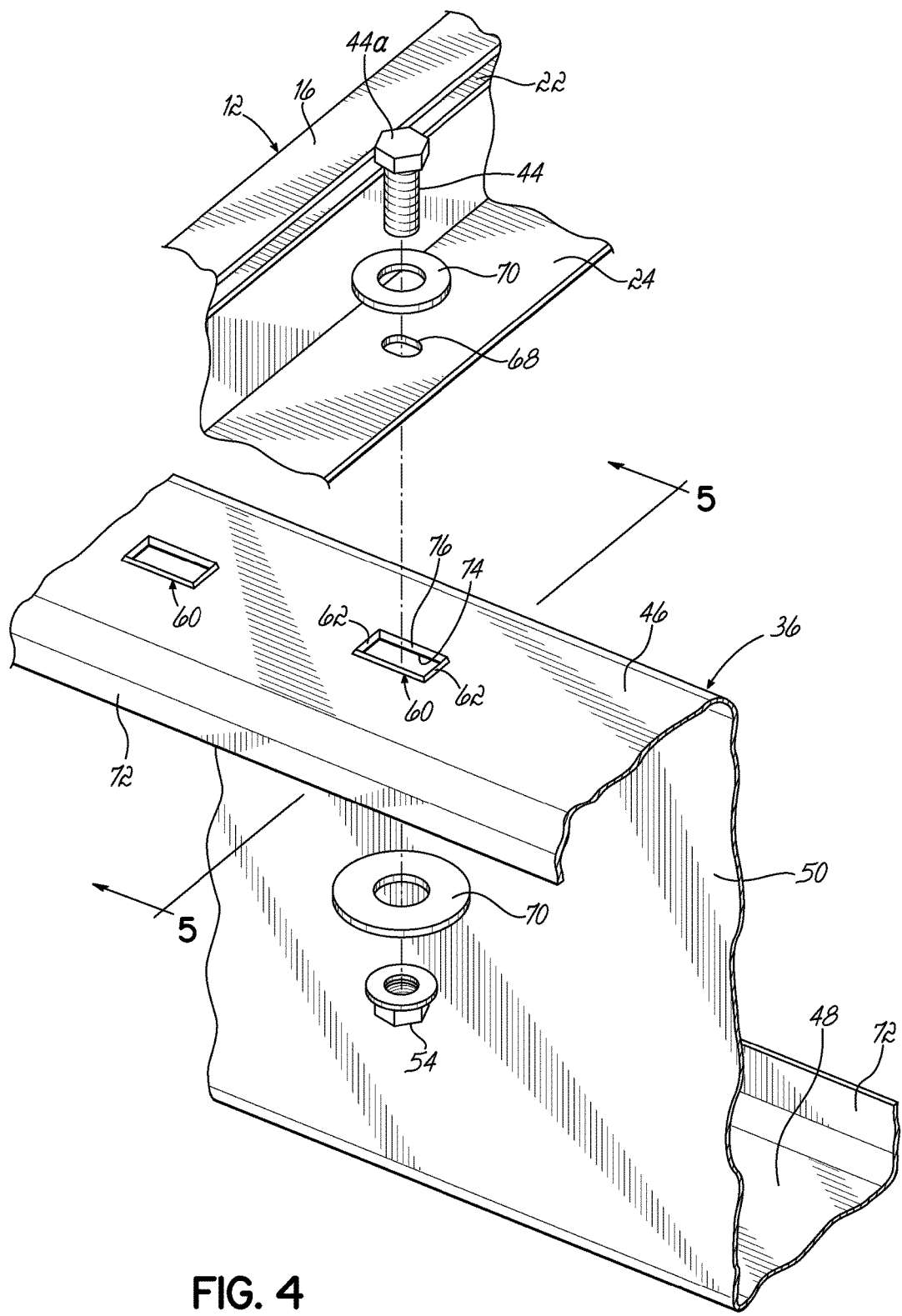
FIG. 4 is an exploded view of the connection between the elongated support rail or purlin and the solar panel of FIG. 3, showing details of a fastener aperture on the elongated support rail or purlin and optional flat washers.
Figure 5:
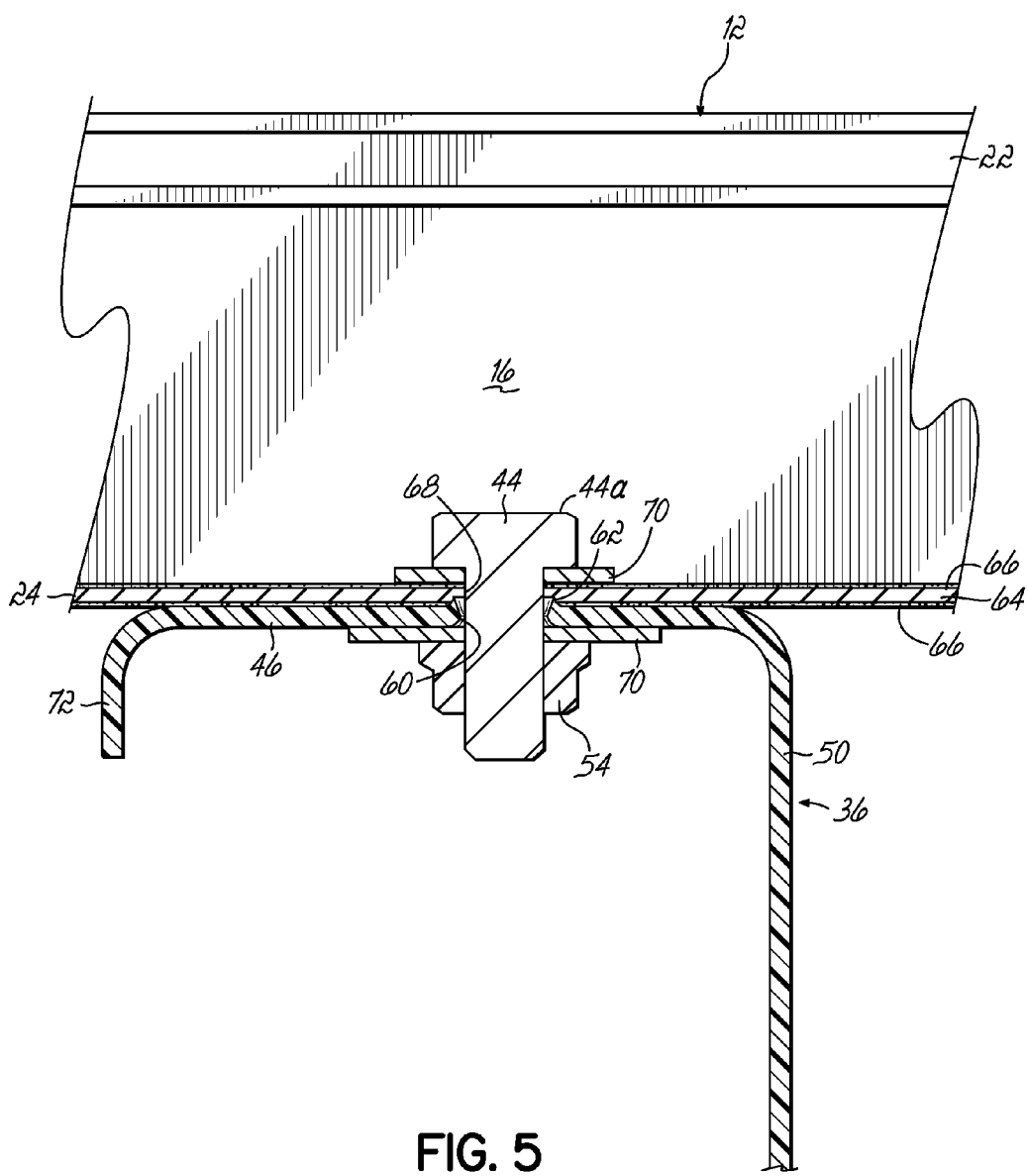
FIG. 5 is a cross-sectional view of the connection between the elongated support rail or purlin and the solar panel of FIG. 3, as taken along line 5-5 in FIG. 4, to show the automatic grounding of the solar panel during mounting of the solar panel.

With reference now to FIGS. 3 through 5, the assembly of the solar panels 12 to the support structure 14 is shown in further detail. As described briefly above, the support structure 14 is advantageously configured to automatically ground the panel frames 16 of the solar panels 12 without requiring the installation of additional components. More particularly, each of the elongated purlins 36 includes fastener apertures 60 with a raised edge 62 on the elongated purlins 36 located proximate to the fastener apertures 60 and configured to make the required electrical bonding contact. The fastener apertures 60 therefore define a grounding structure formed from the material of the elongated purlin 36 itself for the solar mounting system 10. As shown most clearly in FIG. 4, each fastener aperture 60 (only two of which are shown for clarity) is provided on the first supporting surface 46 of the generally Z-shaped elongated purlin 36. The raised edge 62 projects upwardly from the first supporting surface 46 such that when the lower flange 24 of the panel frame 16 is brought into contact with the first supporting surface 46, the raised edge 62 cuts into the panel frame 16 to make a reliable electrical bonding connection. Therefore, even when the panel frame 16 is defined by a conductive material 64 coated with a protective coating 66 as schematically shown in FIG. 5 at the lower flange 24 of the panel frame 16, the elongated purlin 36 itself is still configured to make direct electrical bonding and/or grounding contact with the panel frame 16 by cutting through the protective coating 66 with the raised edge 62.

To this end, the electrical bonding and/or grounding of the solar panels 12 is performed with the elongated purlin 36 of the support structure 14 rather than with additional parts or equipment. Accordingly, the elongated purlin 36 serves both as primary structural support for multiple solar panels 12 as well as the grounding feature, which is a pair of functions not found together in other grounding components or support components known in the field. It will be understood that each elongated purlin 36 includes a series of fastener apertures 60 located along the elongate length for a plurality of solar panels 12 (shown in FIG. 1B, for example), and the two fastener apertures 60 shown in the cutaway portion of the elongated purlin 36 in FIG. 4 are configured to fasten to two adjacent panel frames 16 (only one of which is shown in FIG. 4) of two adjacent solar panels 12 in the final assembly.

The coupling of the solar panel 12 and the elongated purlin 36 in this embodiment is shown in a fully assembled state in FIGS. 3 and 5, and in an exploded view in FIG. 4. These views clarify that the solar panel 12 and the elongated purlin 36 are fastened together via a fastener in the form of a bolt fastener 44 (or a rivet). The bolt fastener 44 is configured to be inserted through a mounting aperture 68 positioned in the lower flange 24 of the panel frame 16 and through the fastener aperture 60 in the elongated purlin 36. A nut 54 is threadably engaged with the bolt fastener 44 and can be tightened to draw the lower flange 24 and first supporting surface 46 together into contact. One or more optional planar washers 70 may be inserted between the bolt head 44a and the lower flange 24 and/or between the nut 54 and the first supporting surface 46. The planar washers 70, when used, increase the surface area of contact for applying the tightening forces from the bolt head 44a and the nut 54 to the solar panel 12 and the elongated purlin 36. However, other embodiments of the solar mounting system 10 may omit these planar washers 70 without affecting the functionality of the coupling. Furthermore, rivets or clamps may be used in place of the bolt fasteners 44 and nuts 54 in other embodiments without departing from the scope of the invention. As a result of the grounding feature being a raised edge 62 formed proximate the fastener aperture 60 of the elongated purlin 36, the bolt fastener 44 by itself is sufficient to both fasten the solar panel 12 in position securely as well as cause the grounding of the conductive material 64 in the panel frame 16. In this regard, no star washers or grounding equipment must be added to the bolt fastener 44 to achieve the necessary electrical bonding and/or grounding. Of course, other embodiments of the invention may combine the use of the raised edge 62 on the elongated purlin 36 with star washers or other grounding equipment positioned in other locations to provide multiple types of grounding of the solar panels 12 without departing from the invention.

As is shown in FIGS. 4 and 5, the panel frame 16 and the elongated purlin 36 are both shaped so as to make the installation and fastening of these components to each other relatively easy. For example, the panel frame 16 includes significant spacing between the upper channel 22 where the photovoltaic cells 20 are located and the lower flange 24 that contains the mounting aperture 68. This spacing enables an operator to reach between the photovoltaic cells 20 and the elongated purlin 36 to hold the bolt fastener 44 or rivet during insertion into the mounting aperture 68 and fastener aperture 60. Similarly, the shape of the elongated purlin 36 (which may be different shapes as described above) provides significant spacing underneath the first supporting surface 46 so that an operator can hold and manipulate the nut 54 that is threadably engaged with the bolt fastener 44. As described in further detail below, the Z-shape of the elongated purlin 36 in the exemplary embodiment may be provided by bending a flat sheet of material into the desired shape either before or after punching the fastener apertures 60 into the first supporting surface 46. The first and second supporting surfaces 46, 48 may also include edge portions 72 that are further bent so as to be generally parallel to the central wall 50 in the exemplary embodiment.

Thus, the process for installing each of the solar panels 12 on the support structure 14 of the solar mounting system 10 is as follows. The solar panel 12 is positioned adjacent to the elongated purlin 36 such that one or more mounting apertures 68 provided on a lower flange 24 of the panel frame 16 are aligned with corresponding fastener apertures 60 formed in one or more of the elongated purlins 36. In one specific example, each solar panel 12 may include four mounting apertures 68, and the fastener apertures 60 are provided in the elongated purlins 36 in corresponding locations so that all the operator has to do is align the plurality of apertures 60, 68. The bolt fastener 44 is then inserted through the mounting apertures 68 and the fastener aperture 60 and engaged with a nut 54 to compress the lower flange 24 into contact with the first supporting surface 46. As the bolt fasteners 44 (or rivets or clamps, in other embodiments) are tightened, the raised edge 62 proximate the periphery 74 of the fastener aperture 60 eventually cuts into and through the protective coating 66 on the surface of the lower flange 24 and enters into contact with the conductive material 64 in the secured position shown in FIG. 5. Consequently, this raised edge 62 provides direct electrical bonding contact between the conductive material 64 of the panel frame 16 and the galvanized steel support structure 14, thereby automatically grounding the solar panel 12 during the fastening of that solar panel 12 into position. No additional washers or grounding equipment needs to be installed to perform this automatic grounding of the solar panel 12. This process of positioning and fastening can then be repeated for each solar panel 12 to be included with the solar mounting system 10, and each elongated purlin 36 may serve as the beginning of a grounding path for multiple solar panels 12 in the exemplary embodiment.

As shown in FIG. 4, the mounting aperture 68 in the panel frame 16 is provided with a circular or oval shape, while the fastener aperture 60 in the elongated purlin 36 of this illustrated embodiment defines a rectangular shape having a plurality of side edges. However, it will be appreciated that both of these apertures 60, 68 may be reshaped and resized according to the needs and preferences of the end user of the solar mounting system 10. For example, other embodiments of the fastener aperture 60 may define different shapes having one or more sides with raised edges, including but not limited to square-shaped, circle-shaped, elongate oval-shaped, star-shaped, and other known shapes. The primary limiting factor in designing the apertures 60, 68 is that the mounting aperture 68 and the fastener aperture 60 must both have sizes that are large enough to freely receive the bolt fastener 44 while also having sizes that are smaller than the bolt head 44a and the nut 54. In addition, the exemplary embodiment shown in FIG. 4 includes a raised edge 62 on the elongated purlin 36 that projects upwardly from all four sides (e.g., the entire periphery 74) of the fastener aperture 60. As described with reference to FIGS. 9 and 10 below, it will be understood that alternative embodiments are envisioned where the raised edge 62 may be formed along only a partial portion of the periphery 74. Moreover, the raised edge 62 is shown having a generally continuous and linear leading end 76 in this exemplary embodiment, but the raised edge 62 may instead be formed with a discontinuous or serrated leading end in other examples without departing from the scope of the invention. The embodiment shown in FIG. 4 has the advantage of maximizing the total area or length of the raised edge 62, which is believed to enhance the likelihood of forming a reliable direct electrical bonding contact with the conductive material 64 in the panel frame 16. Other alternative embodiments are described with reference to FIGS. 11 and 12 below, specifically those embodiments configured to work with clamps for the solar panels 12 instead of bolt fasteners 44 or rivets and other embodiments in which the grounding structure is provided separately from a fastener aperture 60. However, these alternative embodiments do provide similar advantageous benefits when installing the solar panels 12 onto the solar mount system 10.

Figure 6:
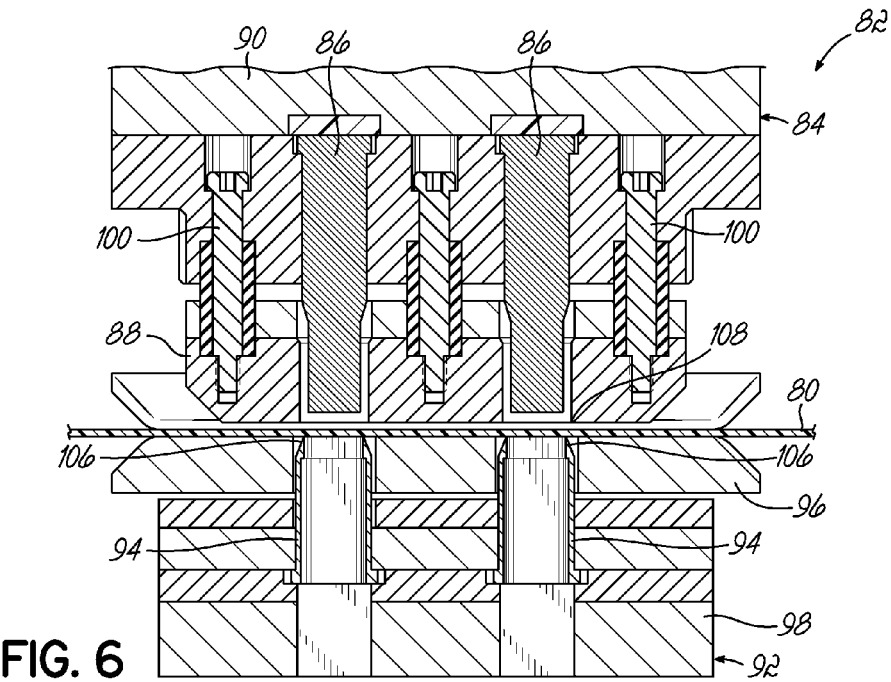
FIG. 6 is a cross-sectional front view of a counterform press used to form the fastener aperture on the elongated support rail or purlin of FIG. 3, the counterform press being shown in an initial position before punching and deformation of a sheet of material that is used to form the fastener aperture on the elongated support rail or purlin.
Figure 7A:
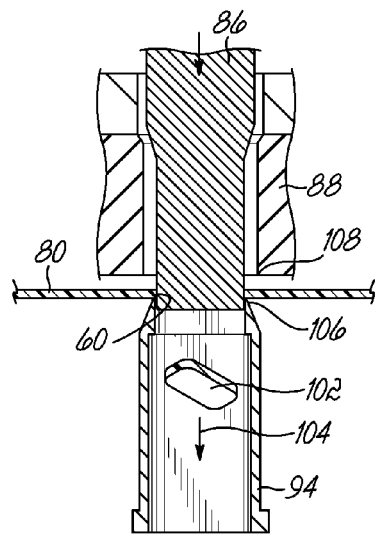
FIG. 7A is a detailed schematic cross-sectional view of moving components of the counterform press of FIG. 6 after the punch has been driven into the sheet of material to form the fastener aperture.
Figure 7B:
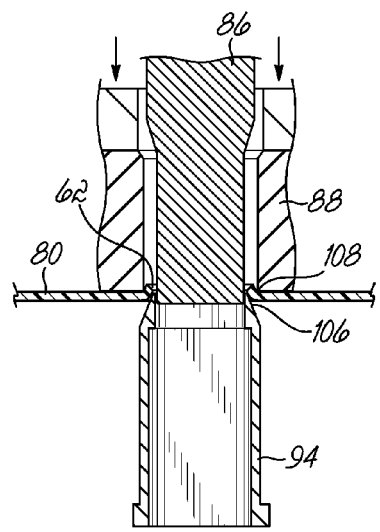
FIG. 7B is a detailed schematic cross-sectional view of the moving components of the counterform press of FIG. 6 after the upper forming die has been driven into the sheet of material to deform a periphery of the fastener aperture of FIG. 7A to form a raised edge located proximate the fastener aperture.
Figure 8:
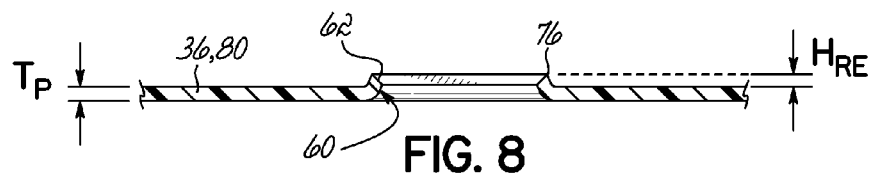
FIG. 8 is a cross-sectional view of the sheet of material of FIG. 7B after removal from the counterform press, thereby illustrating the details of the fastener aperture formed in the elongated support rail or purlin.

With reference to FIGS. 6 through 8, the method of producing an elongated rail or elongated purlin 36, including fastener apertures 60, is shown in further detail. As briefly noted above, the elongated purlin 36 is formed from a sheet of material 80 (galvanized steel in the exemplary embodiment) that begins in a generally planar state. As shown in FIG. 6, the sheet of material 80 is positioned within punching equipment referred to in this description as a counterform press 82. The counterform press 82 includes an upper press portion 84 including a punch 86 and an upper forming die 88 connected to an upper frame 90, and the counterform press 82 also includes a lower press portion 92 including a hollow die button 94 and a lower forming die 96 connected to a lower frame 98. The punch 86 and hollow die button 94 are fixedly engaged with the respective upper and lower frames 90, 98, while the upper and lower forming dies 88, 96 are mounted with supports 100 (only shown for the upper forming die 88) that enable some relative sliding movement of these upper and lower forming dies 88, 96 relative to the upper and lower frames 90, 98. This fixed and moveable mounting of the parts in the upper press portion 84 and the lower press portion 92 enables a multi-step counterform punching process that is performed in a single movement of the upper press portion 84 towards the lower press portion 92. This multi-step counterform punching process is described in further detail with reference to FIGS. 7A and 7B below. It will be understood that different press equipment may be used to form the elongated purlin 36 of the exemplary embodiment in other embodiments.

The counterform punching process enabled by the counterform press 82 shown in FIG. 6 includes a punching or removal of material from the sheet of material 80 to form the fastener aperture 60, as well as a deformation of the periphery 74 around the removed material to form the raised edge 62. Although the counterform press 82 includes a plurality or series of punches 86 and hollow die buttons 94 so that a plurality of fastener apertures 60 may be simultaneously formed in the elongated purlin 36 (sheet of material 80) as shown in FIG. 6, the following description of the counterform punching process refers specifically to FIGS. 7A and 7B, in which much of the structure of the counterform press 82 is removed to highlight the specific steps of the counterform punching process.

Thus, the counterform press 82 is first actuated by driving the upper frame 90 and also the punch 86 downwardly towards the lower press portion 92. This driving movement causes the punch 86 to enter into the hollow die button 94, which is sized for closely receiving the punch 86 in nearly an interference fit. As a result, a portion of material shown as rectangular chip 102 is sheared off the remainder of the sheet of material 80 and is ejected through the hollow die button 94 as shown by arrow 104 in FIG. 7A. It will be understood that in other embodiments where the fastener aperture 60 is to define a different shape, the chip 102 of material sheared off by the punch 86 would also be modified in shape and/or size accordingly. Also during this driving movement, the upper forming die 88 initially slides relative to the upper frame 90 as a result of the supports 100, but then contacts the upper frame 90 and begins to move with the punch 86 and the upper frame 90 (e.g., the gap between the upper frame 90 and the upper forming die 88 is removed).

Continued downward movement of the upper press portion 84 causes the upper forming die 88 to engage the sheet of material 80 and begin pushing the sheet of material 80 and the lower forming die 96 downwardly with respect to the lower frame 98. Because the hollow die button 94 is fixed to the lower frame 98, this movement also causes the hollow die button 94 to be forced upwardly relative to the downward movement of the sheet of material 80. The leading end 106 of the hollow die button 94 pushes into the periphery 74 of the fastener aperture 60 that was just formed by the punch 86, which causes this periphery 74 to deform upwardly around the corners 108 of the upper forming die 88 and also around the leading end 106 of the hollow die button 94, as shown in FIG. 7B. The leading end 106 of the hollow die button 94 may be sharpened or chamfered to further encourage this deforming of the sheet of material 80 at the periphery 74. Then the upper press portion 84 is withdrawn away from the lower press portion 92 back to the initial position of FIG. 6, which leaves the sheet of material 80 in the state shown in FIG. 8 with the fastener apertures 60 and raised edge(s) 62 as previously described. Consequently, the counterform punching process enabled by the counterform press 82 of this embodiment simultaneously produces a series of fastener apertures 60 in accordance with the exemplary embodiment of the invention.

The sheet of material 80 is also bent into the Z-shape to produce the elongated support rail or elongated purlin 36 as shown in the previous figures. It will be well understood that regular bending presses or similar equipment may be used to bend the sheet of material 80 at intended junctions between the first supporting surface 46 and the central wall 50, between the second supporting surface 48 and the central wall 50, and between each of the first and second supporting surfaces 46, 48 and the corresponding edge portions 72. By making these bends parallel to the elongate length of the sheet of material 80, each of the supporting surfaces 46, 48 and the central wall 50 will extend in a uniform manner along the elongate length, which consistently positions the supporting surfaces 46, 48 and fastener apertures 60 for connection to the panel frames 16 of the solar panels 12. The counterform punching process and the bending process described above is repeated for each elongated purlin 36 that needs to be assembled in the support structure 14, thereby producing a plurality of uniform rails or elongated purlins 36 for mounting the solar panels 12. To complete the manufacture of the support structure 14, the plurality of mounting posts 30, chord rails 32, and braces 34 are produced by rolling or bending sheets of material 80 and then the elongated purlins 36 are attached to these chord rails 32 in the configuration shown in FIGS. 1A through 2.

With reference to FIG. 8, the final form of the fastener aperture 60 and raised edge 62 formed proximate the first supporting surface 46 of the elongated purlin 36 is shown in further detail. As seen most clearly in this view, the deformation of the periphery 74 may simply include a bending of the side edges defining the periphery 74 about 45 degrees away from the original horizontal orientation. That enables one of the corners of the periphery 74 to become a sharp leading end 76 pointed generally vertically and ready to cut through a protective coating 66 on the panel frames 16. In the exemplary embodiment in which a rectangular shaped fastener aperture 60 is formed, the thickness $T_P$ of the elongated purlin 36 may be about 0.060 inches and the deformation of the raised edge 62 causes the raised edge 62 to project an additional height $H_{RE}$ of about 0.045 inches above the first supporting surface 46. This relative size of the additional height $H_{RE}$ is large compared to the thickness $T_P$ of the elongated purlin 36 so that the raised edge 62 resists bending back to the original planar condition and the raised edge 62 successfully cuts into or embeds into the panel frames 16 during assembly. Of course, the relative height and thickness dimensions may be modified in other embodiments as well.

Continuing with the exemplary embodiment, the approximate size of the fastener aperture 60 following the counerform punching is about 0.75 inches by 0.375 inches, in the rectangular formation. This size of fastener aperture 60 works well with 5/16 inch bolts and nuts 54 used in the bolt fastener 44, or 5/16 inch rivets when used in place of the bolt fastener 44. In another example, the approximate size of the fastener aperture 60 may be about 0.75 inches by 0.3125 inches in the rectangular formation in order to work well with ¼ inch bolts and nuts 54 of the bolt fastener 44, or ⅜ rivets in embodiments using rivets. As described above, it will be understood that the total and relative dimensions of these elements are provided for exemplary purposes only, but different dimensions may be used in other embodiments of the invention, regardless of whether bolt fasteners 44, rivets, or clamps are used to secure the solar panels 12 in position.

Figure 9:
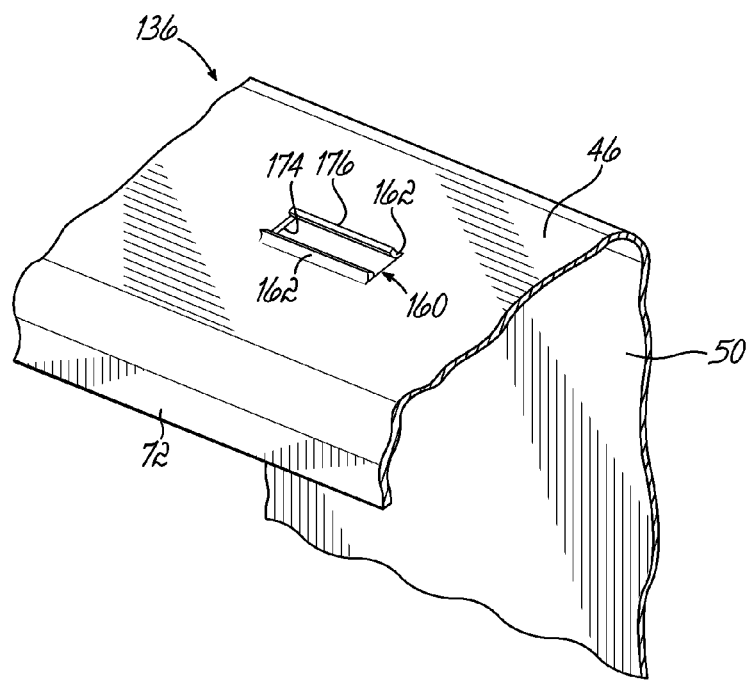
FIG. 9 is a partial perspective view of an alternative embodiment of an elongated support rail or purlin used with the solar mounting system of FIG. 1A, the elongated support rail or purlin of this embodiment including a fastener aperture with a differently-configured raised edge located proximate a portion of the periphery of the fastener aperture.

With reference to FIG. 9, a slightly modified version of the elongated support rail or elongated purlin 136 used with the solar mounting system 10 is shown in further detail. Only a portion of this elongated purlin 136 is shown because the only elements that are modified from the previous embodiment are the fastener aperture 160 and the raised edge 162. All other components are marked with the same reference number where the components remain unchanged, including the first supporting surface 46 and the central wall 50. In this embodiment, only the two longer sides of the periphery 174 are deformed into the raised edge 162, although the leading end 176 of this raised edge 162 remains generally linear and continuous on the two longer sides of the periphery 174 in this embodiment. In order to form such a raised edge 162 that only projects from a portion of the periphery 174 (instead of the entirety of the periphery as in the previous embodiment), the shape and size of the upper forming die 88 relative to the hollow die button 94 would be modified in the counterform press 82. For example, the corners 108 of the upper forming die 88 could be positioned over the leading end 106 of the hollow die button 94 along the shorter sides of the hollow die button 94 such that the shorter sides of the periphery 74 are clamped in position during further movement of the upper forming die 88 rather than being deformed and pushed upwardly. The resulting structure shown in FIG. 9 results from this simplified counterform punching operation and is believed to provide automatic electrical bonding and/or grounding of the solar panels 12 connected to the elongated purlin 136 with similar effectiveness as the first embodiment. It will be understood that any number of the sides of the fastener aperture 60 may be deformed to include the raised edge 62 without departing from the scope of the invention, and the fastener aperture 60 itself may be reshaped from the rectangular shape shown in other embodiments as well. For example, other embodiments of the fastener aperture 60 may define different shapes having one or more sides with raised edges, including but not limited to square-shaped, circle-shaped, elongate oval-shaped, star-shaped, and other known shapes.

Figure 10:
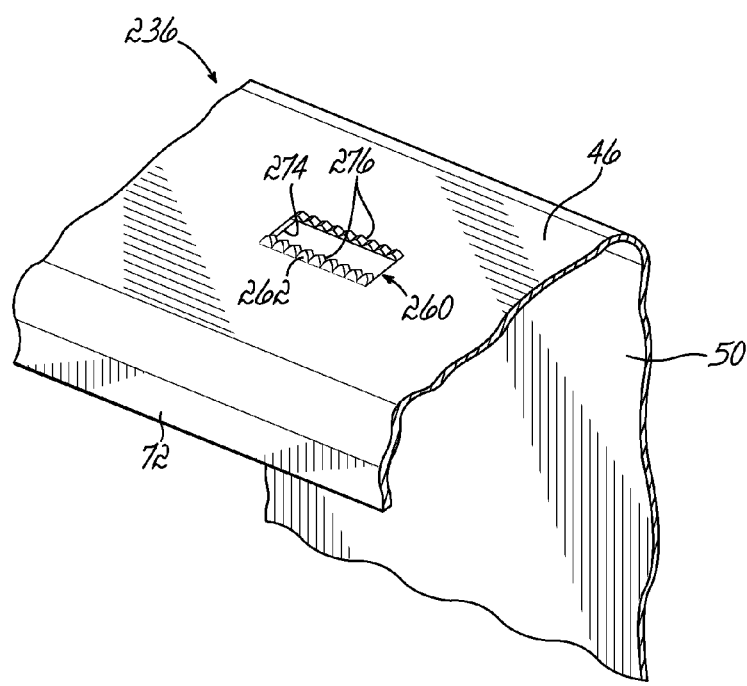
FIG. 10 is a partial perspective view of yet another embodiment of an elongated support rail or purlin used with the solar mounting system of FIG. 1A, the elongated support rail or purlin of this embodiment including a fastener aperture with a differently-configured raised edge that is serrated and discontinuous proximate a portion of the periphery of the fastener aperture.

With reference to FIG. 10, another modified version of the elongated support rail or elongated purlin 236 used with the solar mounting system 10 is shown in further detail. Only a portion of this elongated purlin 236 is shown because the only elements that are modified from the previous embodiments are the fastener aperture 260 and the raised edge 262. All other components are marked with the same reference number where the components remain unchanged, including the first supporting surface 46 and the central wall 50. Similar to the previous embodiment, only the two longer sides of the periphery 274 are deformed into the raised edge 262. Additionally, the leading end 276 of these raised edges 262 are formed with an uneven or discontinuous profile, and more specifically a serrated profile in the illustrated embodiment. The serrated leading end 276 forms a plurality of tooth-like structures that may further enhance the cutting action into the panel frame 16 when the solar panels 12 are coupled to the elongated purlin 236. In order to form such a raised edge 262, the shape and size of the punch 86 relative to the hollow die button 94 would be modified in the counterform press 82. For example, the punch 86 and/or the hollow die button 94 may include a serrated surface that causes the periphery 274 of the fastener aperture 260 that is formed by the punching action to include one or more serrated sides. These serrated sides are then deformed into the raised edges 262, which therefore automatically include the discontinuities or serrations. The resulting structure shown in FIG. 10 results from this modified counterform punching operation and is believed to provide automatic electrical bonding/and or grounding of the solar panels 12 connected to the elongated purlin 236 with similar (or possibly even better) effectiveness as the first embodiment. It will be understood that more or fewer side edges of the periphery 274 may be used to form the raised edge 262, with some or all of these including discontinuities such as serrations at the leading end 276 in other embodiments consistent with the scope of this invention.

Figure 11:
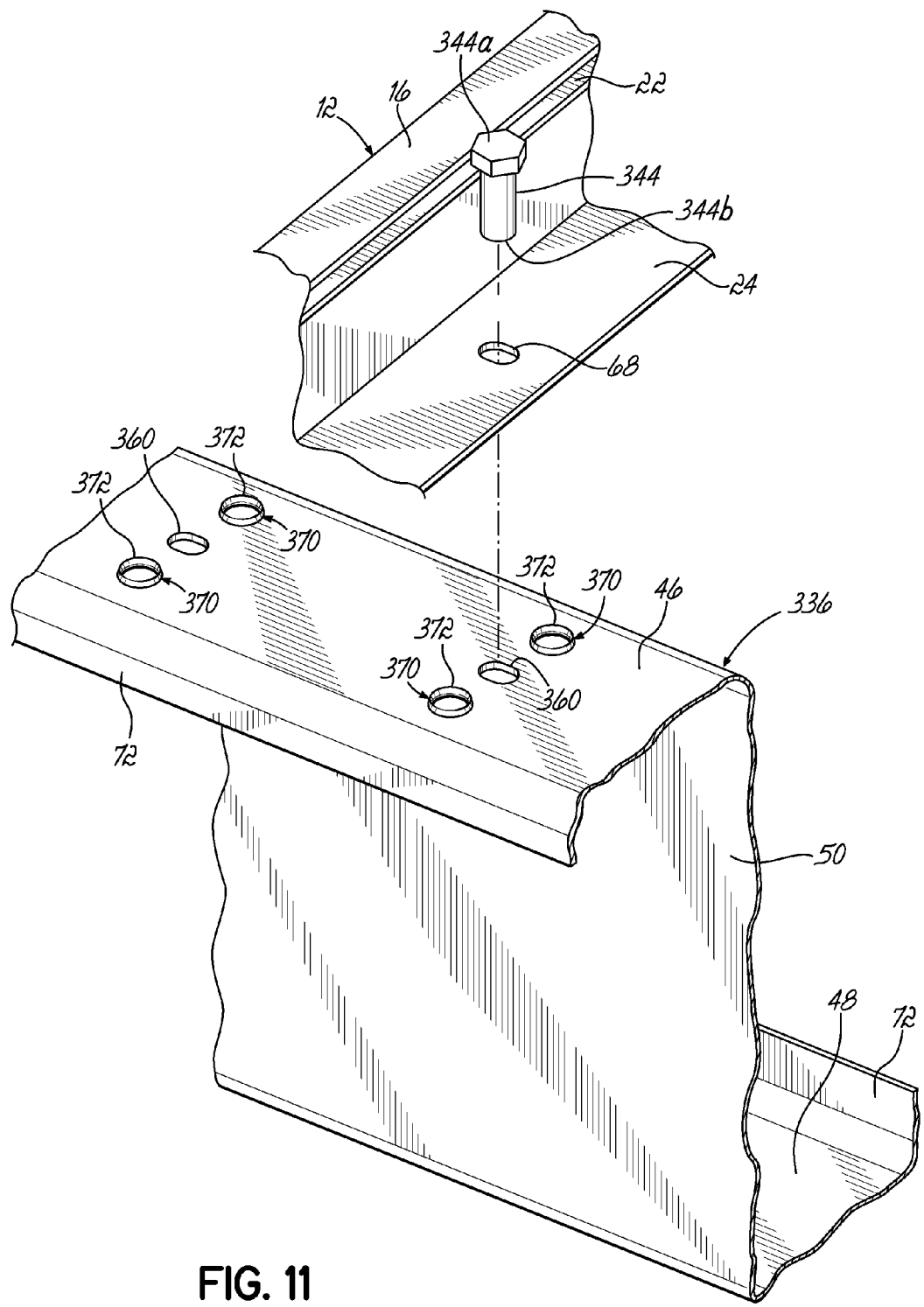
FIG. 11 is a partial perspective view of another embodiment of an elongated support rail or purlin used with the solar mounting system of FIG. 1A, the elongated support rail or purlin of this embodiment including a modified fastener aperture for receiving a rivet fastener instead of a bolt fastener, as well as grounding structures defining raised edges spaced from and proximate to the modified fastener aperture.

With reference to FIG. 11, another modified embodiment of the elongated support rail or elongated purlin 336 used with the solar mounting system 10 is shown in further detail. Only a portion of this elongated purlin 336 is shown because the only elements that are modified from the previous embodiments are a modified fastener aperture 360, the use of a rivet fastener 344, and the addition of one or more grounding structures 370 including a raised edge 372 configured to cut into the conductive material of the panel frame 16 to electrically bond the support structure 14 to the solar panel 12. All other components are marked with the same reference number where the components remain unchanged, including the first supporting surface 46 and the central wall 50.

In this embodiment of FIG. 11, the elongated purlin 336 continues to include the first supporting surface 46 for abutting the panel frame 16, but this first supporting surface 46 includes a modified fastener aperture 360 configured to receive the rivet 344 used with this embodiment rather than the bolt fastener 44 and nut 54 shown in FIG. 4. To this end, the modified fastener aperture 360 is generally oval-shaped and sized similarly to the mounting aperture 68 in the panel frame 16 at the lower flange 24. It will be understood that the modified fastener aperture 360 may define other shapes and sizes in other embodiments as well. The fastener aperture 360 of this embodiment does not include the raised edge for electrically bonding with the panel frame 16; instead, separate grounding structures 370 formed from the material of the purlin 336 are separately provided in the first supporting surface 46 so as to be spaced from the fastener aperture 360 and the rivet 344, after insertion through the fastener aperture 360. In this regard, the separate grounding structures 370 of this embodiment include punched generally circular apertures with a raised edge 372 formed by a counterform punching process such as the one described in detail above. As with the previous embodiments, the grounding structures 370 may define apertures of different shapes and sizes other than circular in other embodiments, and the raised edge 372 may only be formed along a portion of the periphery in some embodiments without departing from the scope of the present invention. As is well understood in the fastening field, the rivet 344 includes a head portion 344a and a tail end 344b that is configured to be punched or deformed after the rivet 344 is inserted through the mounting aperture 68 and the fastener aperture 360 to secure the rivet 344 firmly in position with the panel frame 16 clamped in abutting contact by the rivet 344 to the first supporting surface 46. The deformation of the tail end 344b of the rivet 344 causes the raised edge 372 on the grounding structures 370 to cut into electrical bonding or grounding contact with the conductive material on the panel frame 16, even when the panel frame 16 is coated with a protective coating. Accordingly, the benefits of the automatic grounding of the solar panel 12 is also achieved even when the grounding structures 370 are provided as separate elements spaced from the fastener aperture 360.

Figure 12:
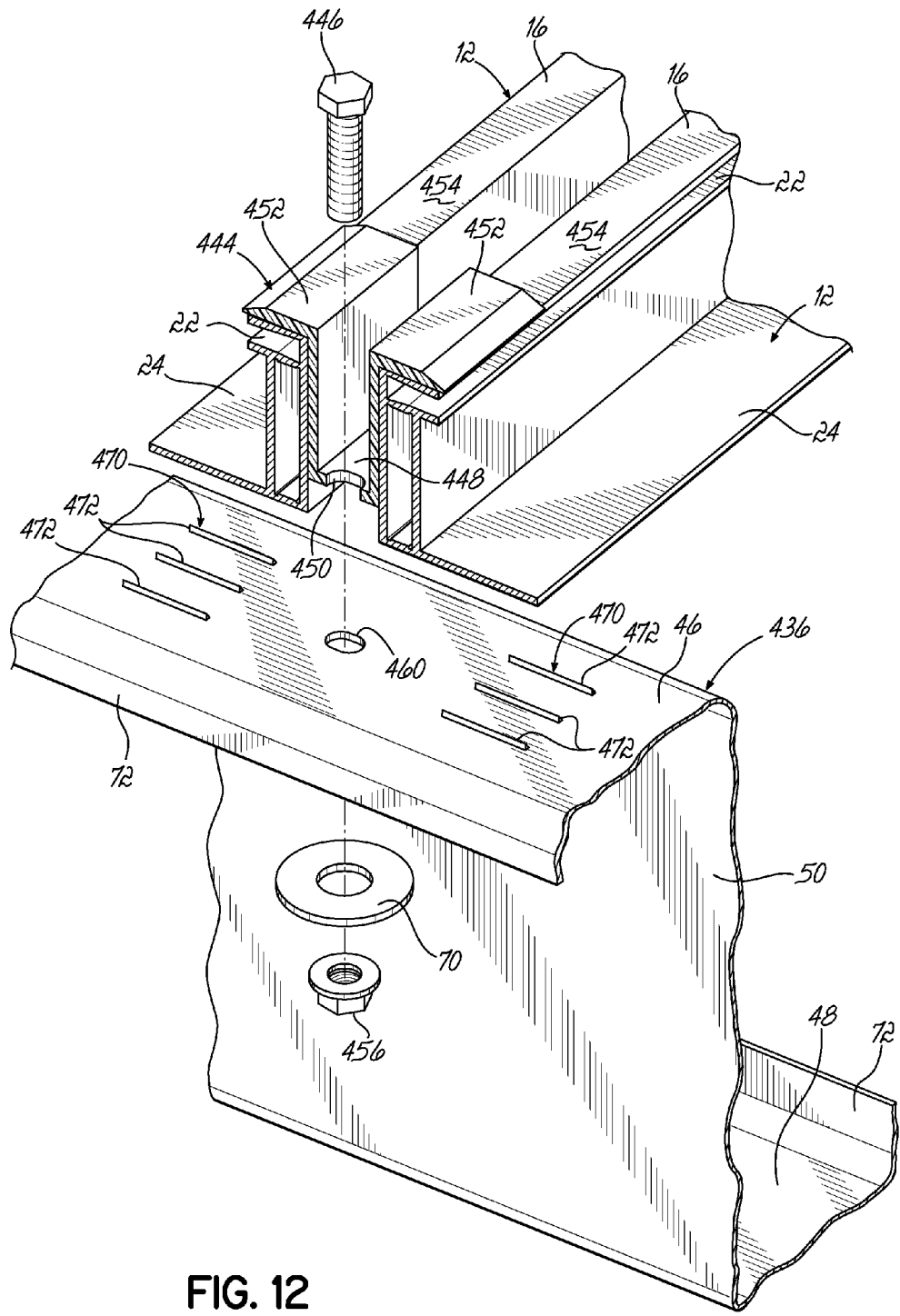
FIG. 12 is a partial perspective view of still another embodiment of an elongated support rail or purlin used with the solar mounting system of FIG. 1A, the elongated support rail or purlin of this embodiment including a clamp for securing the solar panels instead of a bolt or rivet fastener, as well as grounding structures defining raised edges spaced from and proximate to a clamp aperture located in the elongated support rail or purlin.

Of course, it is also understood that the solar panels 12 may be secured in position using clamps or other structures instead of the fasteners described above. With reference to FIG. 12, another modified version of the elongated support rail or elongated purlin 436 used with the solar mounting system 10 is shown in further detail. Only a portion of this elongated purlin 436 is shown because the only elements that are modified from the previous embodiments are a modified clamp aperture 460, the use of a clamp 444, and the addition of one or more grounding structures 470 including linear raised edges 472 configured to cut into the conductive material of the panel frame 16 to electrically bond the support structure 14 to the solar panel 12. All other components are marked with the same reference number where the components remain unchanged, including the first supporting surface 46 and the central wall 50.

In this embodiment of FIG. 12, the elongated purlin 436 continues to include the first supporting surface 46 for abutting the panel frame 16, but this first supporting surface 46 includes a modified clamp aperture 460 configured to receive a fastener 446 used with the U-shaped clamp 444 that is a known clamp for use in clamping multiple adjacent solar panels 12 to the supporting structure 14. To this end, the U-shaped clamp 444 includes a base portion 448 with an aperture 450 configured to receive the fastener 446 following alignment with the modified clamp aperture 460 located in the elongated purlin 436. The U-shaped clamp 444 also includes two arms 452 that extend upwardly from the base portion 448 so as to project over a top surface 454 on each of two adjacent panel frames 16 of solar panels 12. It will be understood that when a clamp is to be used at an edge of a single solar panel 12 rather than between multiple solar panels 12, the U-shaped structure of the clamp 44 may be modified to suit the application at those locations, and these modified clamps are also well known in the solar support art. Similar to the previous embodiments described, the clamp 444 secures the panel frames 16 into abutting contact with the first supporting surface 46 of the elongated purlin 436 by engaging a nut 456 with the fastener 446 after the clamp 444 is positioned with the arms 452 over the panel frames 16 and the base portion 448 aligned with the modified clamp aperture 460 located generally between the two solar panels 12. The tightening of the nut 456 and the fastener 446 draws the clamp 444 downwardly and thereby forces the lower flange 24 of the panel frames 16 into secured contact with the elongated purlin 436. It will be understood that other types of clamps may also be used, including those with different types of fasteners or no fasteners at all in other embodiments, as long as the clamp used places the panel frames 16 into tight abutting contact with the first supporting surface 46 of the elongated purlin 436.

As shown in FIG. 12, the modified clamp aperture 460 is generally oval-shaped. Because the clamp 444 fastens the panel frames 16 without requiring a fastener (bolt, rivet, etc.) inserted through the lower flange 24, there are no mounting apertures 68 included in the lower flanges 24 in this embodiment of the solar mounting system 10. It will be understood that the clamp aperture 460 may define other shapes and sizes in other embodiments as well. Similar to the previous embodiment of FIG. 11, the clamp aperture 460 of this embodiment does not include the raised edge for electrically bonding with the panel frame 16; instead, separate grounding structures 470 formed from the material of the purlin 436 are separately provided in the first supporting surface 46 so as to be spaced from the clamp aperture 460. In this regard, the separate grounding structures 470 of this embodiment include punched or deformed generally linear raised edges 472 formed by a punching or similar process such as the one described in detail above. One or more of the linear raised edges 472 may be formed by the material of the purlin 436 in parallel formation proximate to the clamp aperture 460 in order to provide multiple points of electrical bonding with the associated panel frame 16. As with the previous embodiments, the grounding structures 470 may instead define apertures of various shapes (having raised edges) instead of isolated raised edges without departing from the scope of the present invention. The raised edges 472 may also be provided in non-parallel or non-linear orientations in other embodiments consistent with the present invention. The clamping force applied by the clamp 444 causes the raised edges 472 of the grounding structures 470 to cut into electrical bonding or grounding contact with the conductive material on the panel frame 16, even when the panel frame 16 is coated with a protective coating. Accordingly, the benefits of the automatic grounding of the solar panel 12 is also achieved even when the grounding structures 470 are provided as separate elements (that may not even be apertures) spaced from the clamp aperture 460 and used with clamps 444 instead of bolt or rivet fasteners.

Regardless of the particular embodiment chosen for the elongated purlin 36, 136, 236, 336, 436 the automatic grounding enabled during installation of the solar panels 12 on the support structure 14 is simplified and more cost-efficient than alternative designs using additional grounding equipment. Although the elongated purlin 36 with a raised edge 62 proximate fastener apertures 60 may be used in combination with other grounding devices and methods, the raised edge 62 reliably cuts into the conductive material 64 of the panel frames 16 and can therefore function effectively to electrically bond and/or ground these solar panels 12 without additional elements. In addition, the raised edge 62 or grounding structures may be modified and used with various different fasteners, clamps, and other known mechanisms for securing the solar panels 12 onto the purlins 36. Furthermore, because the grounding feature (raised edge 62) is formed directly in the galvanized steel of the elongated purlin 36, the panel frames 16 are less likely to be able to bend or deform the raised edge 62 away from the direct electrical bonding contact during positioning and securing. Consequently, the elongated purlin 36 with the fastener apertures 60 of this invention provides numerous benefits and advantageous operation compared to the known grounding features used with solar mounting systems.

While the present invention has been illustrated by the description of exemplary embodiments thereof, and while these embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A solar mounting system, comprising:
    at least one solar panel including at least one photovoltaic cell and a panel frame manufactured from a conductive material and supporting the at least one photovoltaic cell; and
    a support structure including a plurality of support members configured to support the at least one solar panel above a base surface and at least one elongated support rail supported by at least one of the plurality of support members and including a grounding structure defining a raised edge formed from material of the at least one elongated support rail, wherein the at least one elongated support rail includes a first supporting surface extending along a plane, with the at least one elongated support rail defining a thickness at the first supporting surface, and the raised edge projects outwardly from the first supporting surface of the at least one elongated support rail such that the raised edge extends in a direction perpendicular to the plane an additional height above the thickness of the at least one elongated support rail and towards the at least one solar panel,
    wherein when the at least one solar panel is secured with the at least one elongated support rail with the panel frame abutting the first supporting surface, the raised edge of the grounding structure on the at least one elongated support rail embeds into the panel frame as a result of projecting the additional height above the thickness of the at least one elongated support rail, thereby to provide direct electrical contact with the conductive material of the panel frame to ground the at least one solar panel.

2. The solar mounting system of claim 1, wherein the at least one elongated support rail comprises a purlin having the first supporting surface provided with the grounding structure, a second supporting surface spaced from the first supporting surface and configured to be mounted on at least one of the plurality of support members, and at least one wall extending between and connecting the first and second supporting surfaces.

3. The solar mounting system of claim 1, wherein the raised edge of the grounding structure includes at least one of a serrated leading end or a discontinuous leading end.

4. The solar mounting system of claim 1, wherein the conductive material of the panel frame is coated with a protective coating configured to protect the conductive material from environmental conditions, and wherein the raised edge of the grounding structure on the at least one elongated support rail is configured to cut through the protective coating.

5. The solar mounting system of claim 1, wherein the at least one elongated support rail includes at least one fastener aperture formed therethrough and defined by a periphery, the raised edge of the grounding structure being located proximate at least a portion of the periphery, and wherein the panel frame of the at least one solar panel includes a mounting aperture formed therethrough such that the mounting aperture of the panel frame and the at least one fastener aperture of the at least one elongated support rail are configured to receive a fastener used to secure the panel frame with the at least one elongated support rail.

6. The solar mounting system of claim 5, wherein the at least one elongated support rail includes a plurality of fastener apertures, and the at least one solar panel of the solar mounting system is a plurality of solar panels each having a respective panel frame including the mounting aperture aligned with a respective one of the plurality of fastener apertures, such that the at least one elongated support rail supports the plurality of solar panels.

7. The solar mounting system of claim 5, further comprising:
    a bolt sized for insertion through the mounting aperture of the panel frame and the at least one fastener aperture of the at least one elongated support rail; and
    a nut configured to engage the bolt to apply a tightening force to engage the raised edge of the grounding structure on the at least one elongated support rail into direct electrical contact with the conductive material of the panel frame.

8. The solar mounting system of claim 5, wherein the periphery of the at least one fastener aperture includes a plurality of side edges, and wherein the raised edge of the grounding structure is provided proximate at least one of the plurality of side edges.

9. The solar mounting system of claim 5, wherein the raised edge of the grounding structure is located proximate an entirety of the periphery of the at least one fastener aperture.

10. The solar mounting system of claim 5, further comprising:
    a rivet fastener sized for insertion through the mounting aperture of the panel frame and the at least one fastener aperture of the at least one elongated support rail, the rivet fastener configured to apply a tightening force to engage the raised edge of the grounding structure on the at least one elongated support rail into direct electrical contact with the conductive material of the panel frame, wherein the raised edge of the grounding structure is located spaced from the at least one fastener aperture of the at least one elongated support rail.

11. The solar mounting system of claim 1, wherein the at least one elongated support rail includes at least one clamp aperture formed therethrough, the raised edge of the grounding structure is located spaced from the at least one clamp aperture, and the solar mounting system further comprises:
a clamp including a clamp fastener configured for insertion through the at least one clamp aperture of the at least one elongated support rail, the clamp configured to force the panel frame of the at least one solar panel to engage with the at least one elongated support rail when the clamp fastener is tightened into engagement with the clamp and the at least one elongated support rail.

12. An elongated support rail configured to be used to support at least one solar panel in a solar mounting system, wherein the at least one solar panel includes a panel frame manufactured from a conductive material and supporting at least one photovoltaic cell, the elongated support rail comprising:
a first supporting surface including a grounding structure defining a raised edge formed from material of the first supporting surface, wherein the first supporting surface extends along a plane, with the elongated support rail defining a thickness at the first supporting surface, and the raised edge projects outwardly from the first supporting surface such that the raised edge extends in a direction perpendicular to the plane an additional height above the thickness of the elongated support rail;
a second supporting surface configured to be supported by a support structure of the solar mounting system; and
at least one wall extending between and connecting the first and second supporting surfaces,
wherein when the at least one solar panel is secured with the first supporting surface with the panel frame abutting the first supporting surface, the raised edge of the grounding structure on the first supporting surface embeds into the panel frame as a result of projecting the additional height above the thickness of the at least one elongated support rail, thereby to provide direct electrical contact with the conductive material of the panel frame to ground the at least one solar panel.

13. The elongated support rail of claim 12, further comprising:
at least one fastener aperture formed through the first supporting surface and defined by a periphery, the raised edge of the grounding structure being located proximate at least a portion of the periphery,
wherein the panel frame of the at least one solar panel includes a mounting aperture formed therethrough such that the mounting aperture of the panel frame and the at least one fastener aperture are configured to receive a fastener used to secure the panel frame with the first supporting surface.

14. The elongated support rail of claim 13, further comprising:
a rivet fastener sized for insertion through the mounting aperture of the panel frame and the at least one fastener aperture, the rivet fastener configured to apply a tightening force to engage the raised edge of the grounding structure on the first supporting surface into direct electrical contact with the conductive material of the panel frame, wherein the raised edge of the grounding structure is located spaced from the at least one fastener aperture.

15. The elongated support rail of claim 12, further comprising:
at least one clamp aperture formed through the first supporting surface, wherein the raised edge of the grounding structure is located spaced from the at least one clamp aperture; and
a clamp including a clamp fastener configured for insertion through the at least one clamp aperture on the first supporting surface, the clamp configured to force the panel frame of the at least one solar panel to engage with the first supporting surface when the clamp fastener is tightened into engagement with the clamp and the elongated support rail.

16. A method of installing a solar mounting system, comprising:
providing the solar mounting system; so that the system comprises:
at least one solar panel including at least one photovoltaic cell and a panel frame manufactured from a conductive material and supporting the at least one photovoltaic cell; and
a support structure including a plurality of support members configured to support the at least one solar panel above a base surface and at least one elongated support rail supported by at least one of the plurality of support members and including a grounding structure defining a raised edge formed from material of the at least one elongated support rail, wherein the at least one elongated support rail includes a first supporting surface extending along a plane, with the at least one elongated support rail defining a thickness at the first supporting surface, and the raised edge projects outwardly from the first supporting surface of the at least one elongated support rail such that the raised edge extends in a direction perpendicular to the plane an additional height above the thickness of the at least one elongated support rail and towards the at least one solar panel;
establishing the support structure on the base surface;
positioning the at least one solar panel having the panel frame adjacent to the at least one elongated support rail of the support structure;
securing the panel frame with the at least one elongated support rail such that the panel frame abuts the first supporting surface; and
grounding the at least one solar panel by embedding the raised edge of the grounding structure on the at least one elongated support rail into the panel frame as a result of projecting the additional height above the thickness of the at least one elongated support rail, thereby to provide direct electrical contact between the raised edge on the at least one elongated support rail with the conductive material of the panel frame when the panel frame is secured with the at least one elongated support rail.

17. The method of claim 16, wherein the conductive material of the panel frame is coated with a protective coating configured to protect the conductive material from environmental conditions, and wherein grounding the at least one solar panel further comprises:
cutting through the protective coating on the panel frame with the raised edge on the at least one elongated support rail when the at least one solar panel is secured with the at least one elongated support rail.

18. The method of claim 16, wherein the at least one elongated support rail includes at least one fastener aperture formed therethrough and defined by a periphery, the raised edge of the grounding structure being located proximate at least a portion of the periphery, and securing the panel frame further comprises:
aligning a mounting aperture formed through the panel frame with the at least one fastener aperture on the at least one elongated support rail; and inserting a fastener through the mounting aperture and the at least one fastener aperture.

19. The method of claim 18, wherein the fastener includes a bolt and a nut, and securing the panel frame further comprises:

engaging and tightening the nut onto the bolt after the bolt has been inserted through the mounting aperture and the at least one fastener aperture, thereby applying a tightening force to engage the raised edge of the grounding structure on the at least one elongated support rail into direct electrical contact with the conductive material of the panel frame.

20. The method of claim 18, wherein the fastener includes a rivet fastener, the raised edge of the grounding structure is located spaced from the at least one fastener aperture, and securing the panel frame further comprises:

deforming the rivet fastener after insertion of the rivet fastener through the mounting aperture and the at least one fastener aperture, thereby applying a tightening force to engage the raised edge of the grounding structure on the at least one elongated support rail into direct electrical contact with the conductive material of the panel frame.

21. The method of claim 18, wherein establishing the support structure further includes:

counterform punching the at least one fastener aperture through a sheet of material such that a portion of the sheet of material is removed to define the periphery of the at least one fastener aperture and another portion of the sheet of material is deformed to produce the raised edge proximate to the periphery;

bending the sheet of material into the at least one elongated support rail by forming a first supporting surface including the at least one fastener aperture following the counterform punching, a second supporting surface spaced from the first supporting surface, and at least one wall extending between and connecting the first and second supporting surfaces; and attaching the at least one elongated support rail to the plurality of support members such that the second supporting surface is contacted and supported by the plurality of support members.

22. The method of claim 16, wherein the at least one elongated support rail includes at least one clamp aperture formed therethrough, the raised edge of the grounding structure being located spaced from the at least one clamp aperture, and securing the panel frame further comprises:

positioning a clamp adjacent to the panel frame and the at least one elongated support rail;

inserting a clamp fastener through the clamp and the at least one clamp aperture in the at least one elongated support rail; and tightening the clamp fastener to force the panel frame of the at least one solar panel to engage with the at least one elongated support rail, thereby applying a tightening force to engage the raised edge of the grounding structure on the at least one elongated support rail into direct electrical contact with the conductive material of the panel frame.

* * * * *